June 4, 1940.  W. W. LANDSIEDEL  2,203,336
COMPUTING AND LISTING MACHINE
Filed March 13, 1936    12 Sheets-Sheet 1

INVENTOR.
Walter W Landsiedel

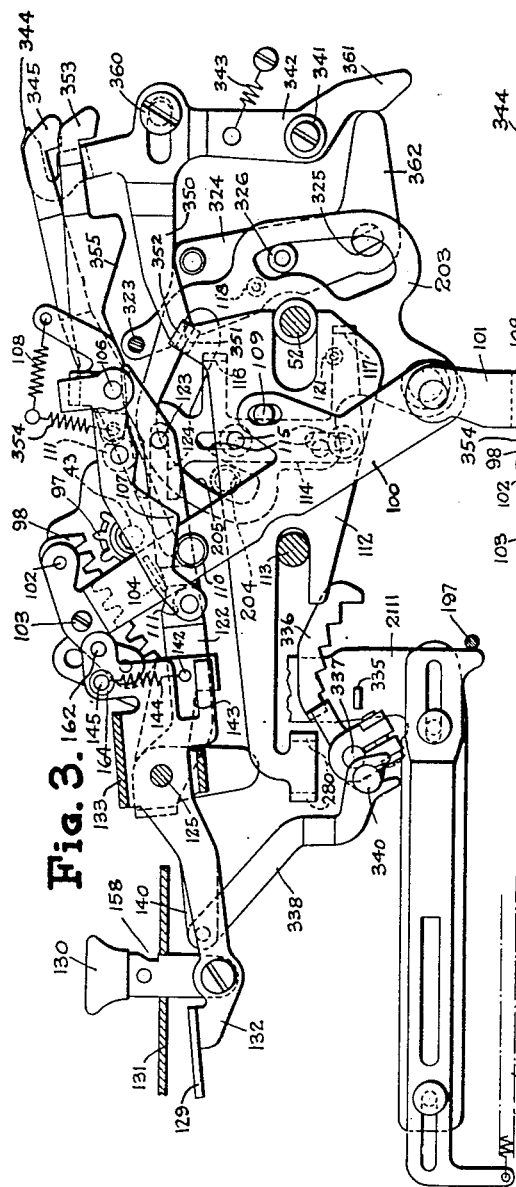

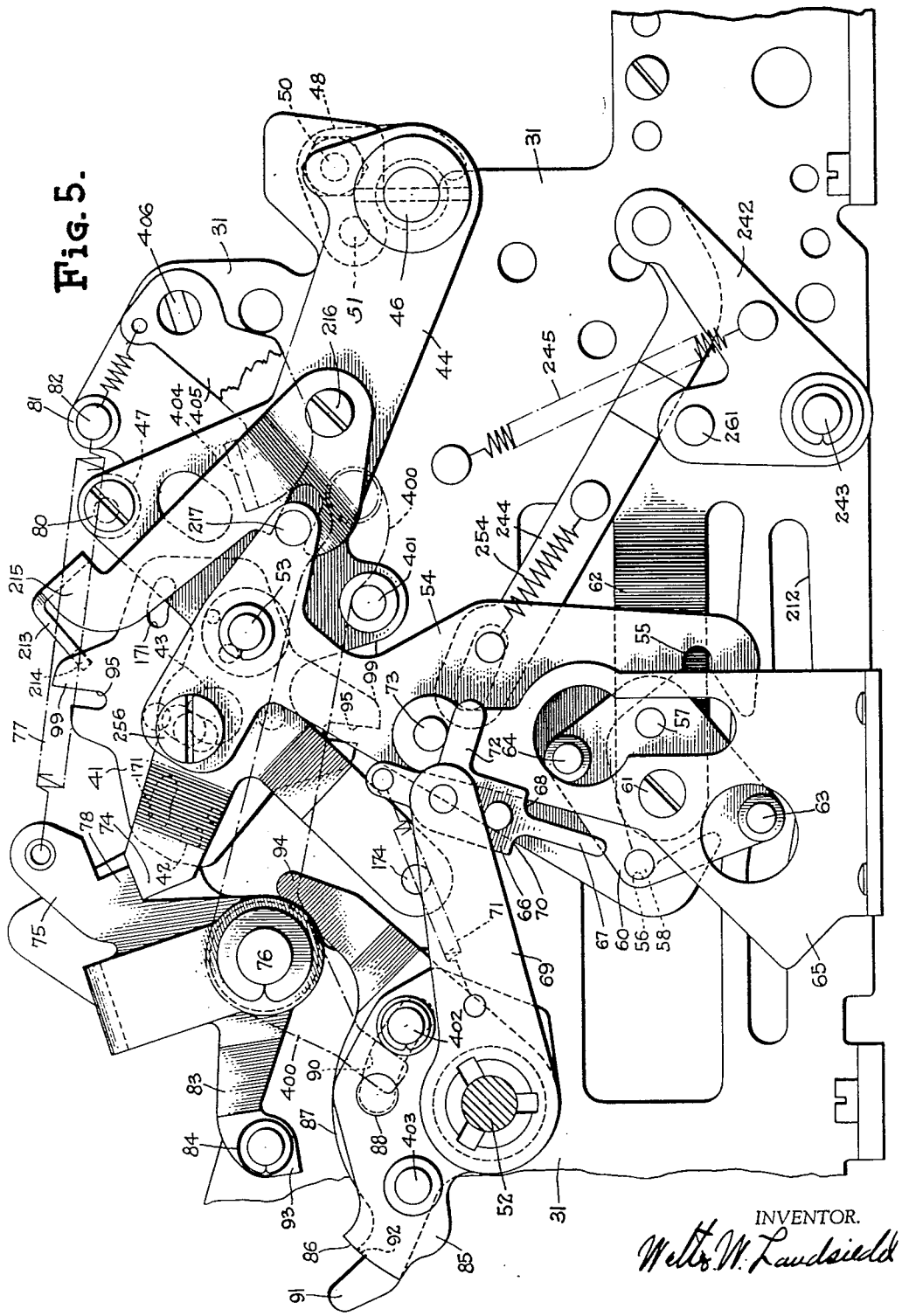

INVENTOR.
Walter W. Landsiedel

June 4, 1940.  W. W. LANDSIEDEL  2,203,336
COMPUTING AND LISTING MACHINE
Filed March 13, 1936  12 Sheets-Sheet 6

INVENTOR.
Walter W Landsiedel

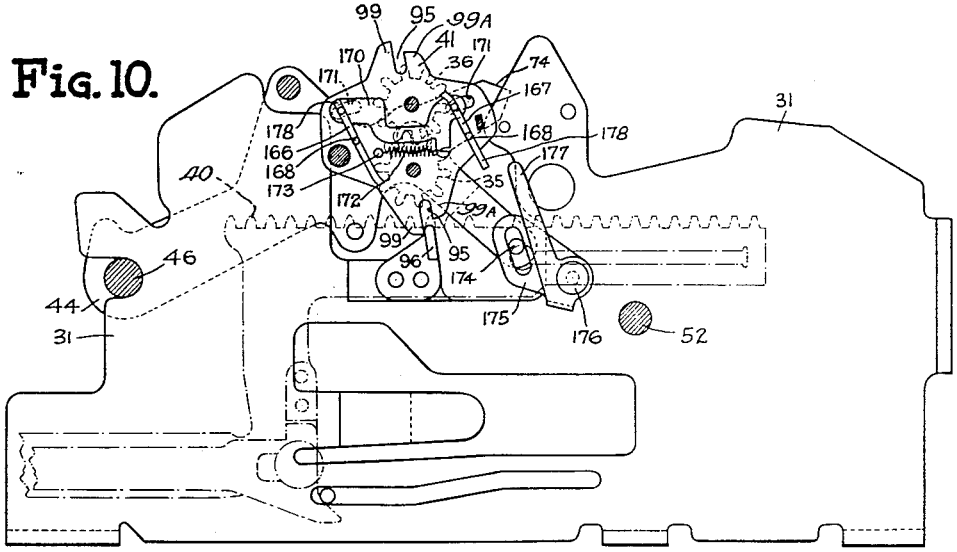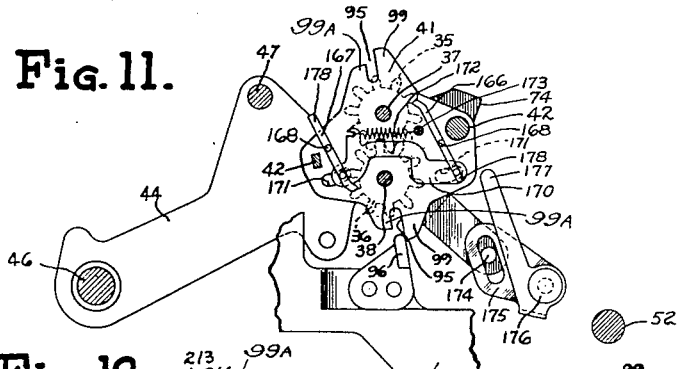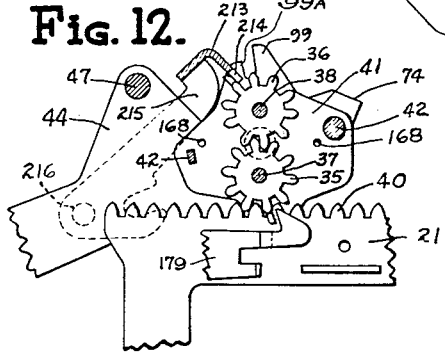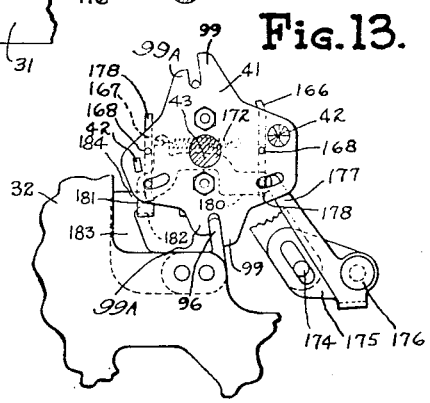

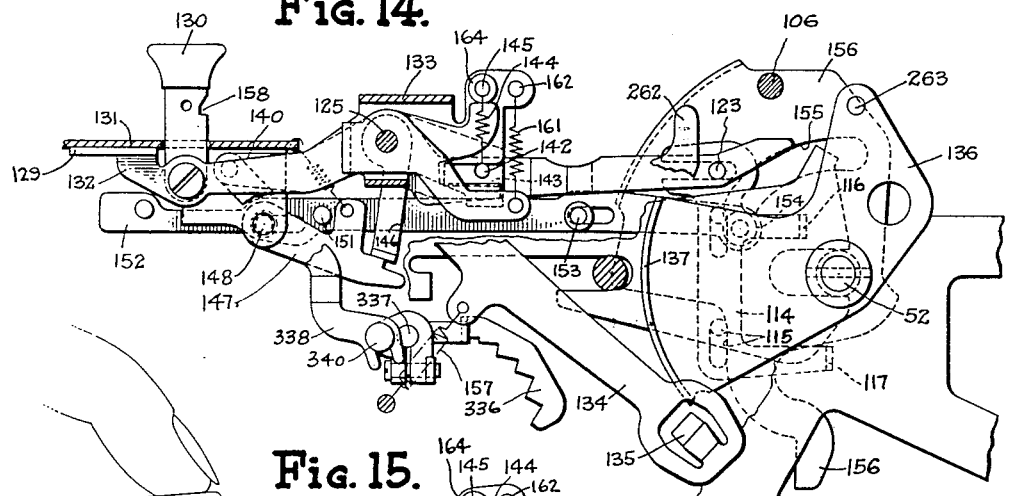

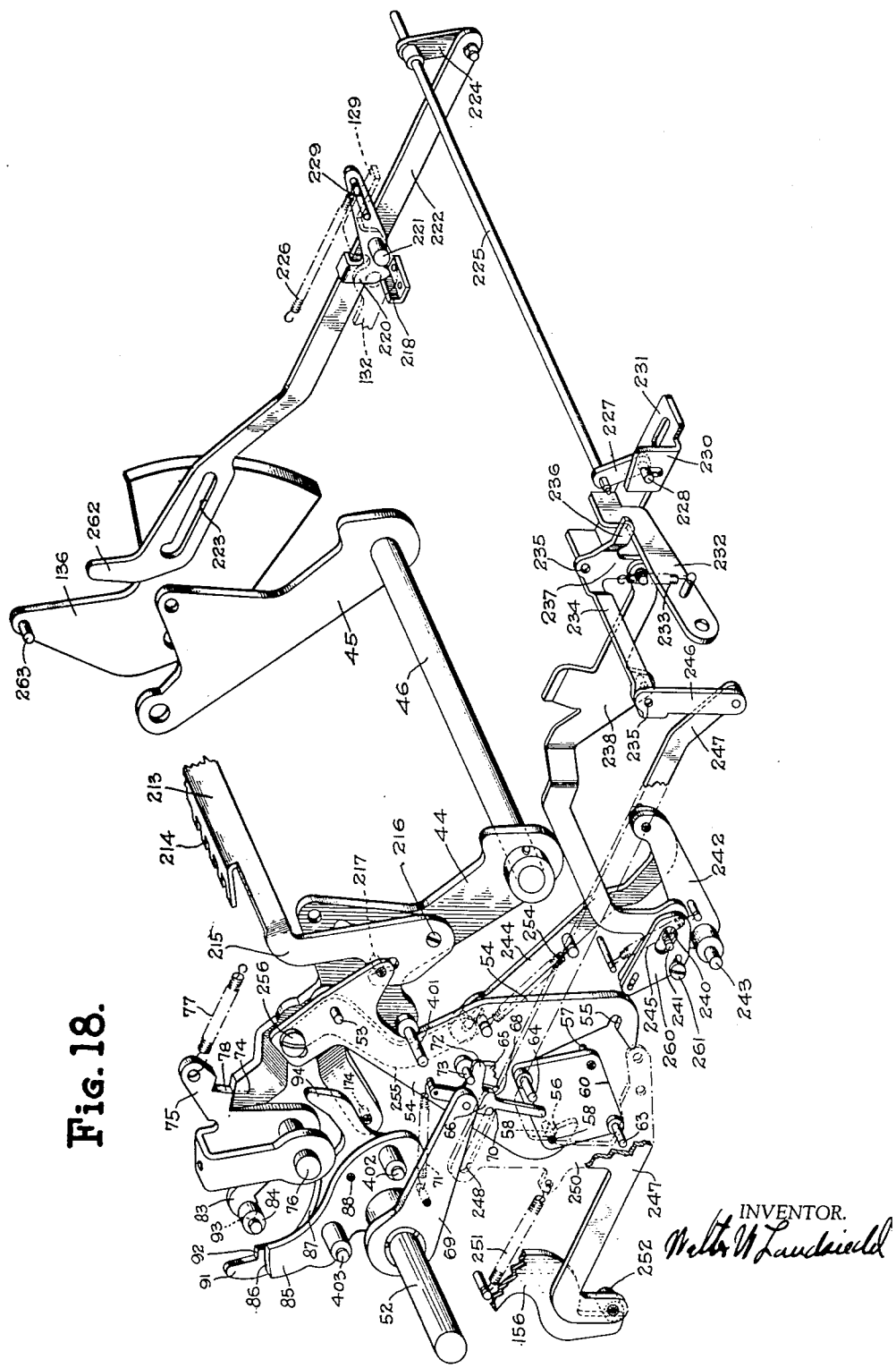

June 4, 1940. W. W. LANDSIEDEL 2,203,336
COMPUTING AND LISTING MACHINE
Filed March 13, 1936 12 Sheets-Sheet 10
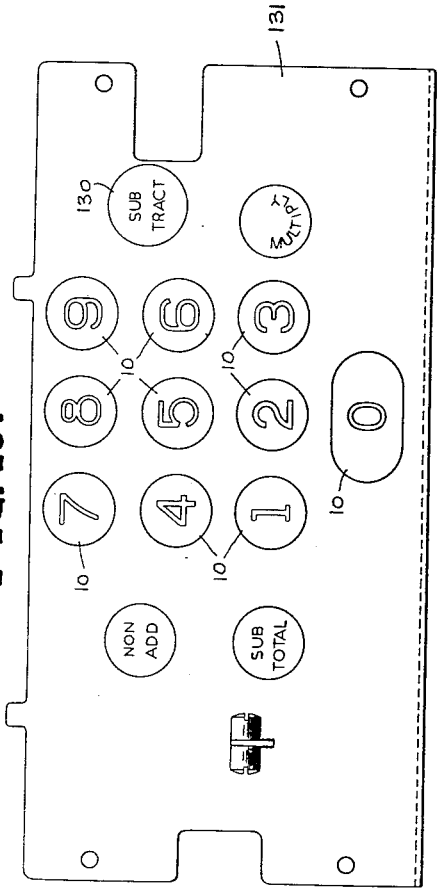
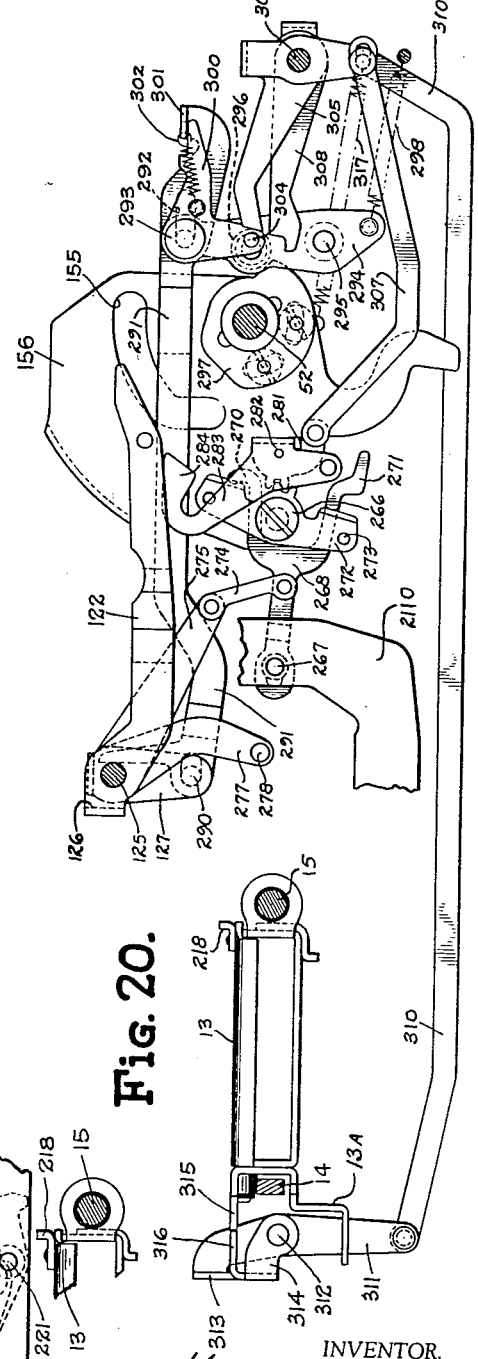
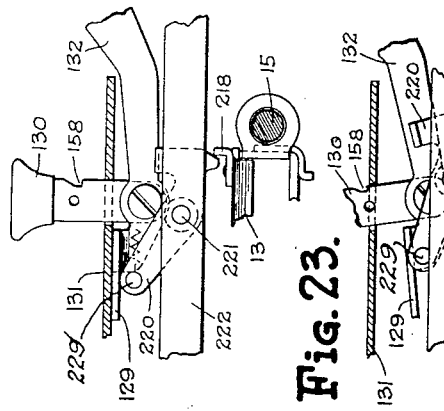
INVENTOR.
Walter W. Landsiedel June 4, 1940.   W. W. LANDSIEDEL   2,203,336
COMPUTING AND LISTING MACHINE
Filed March 13, 1936   12 Sheets-Sheet 12

INVENTOR
WALTER W. LANDSIEDEL
BY H. A. Spark
ATTORNEY

Patented June 4, 1940

2,203,336

UNITED STATES PATENT OFFICE 2,203,336

COMPUTING AND LISTING MACHINE

Walter W. Landsiedel, Norwood, Ohio, assignor to Remington Rand Inc., Buffalo, N. Y., a corporation of Delaware Application March 13, 1936, Serial No. 68,694

12 Claims.   (Cl. 235—60)

The present invention relates to computing and recording machine, and it resides in certain improvements, features of construction and combinations and arrangements of parts, all of which will be fully set forth herein and particularly pointed out in the claims.

A specific machine embodying the invention is shown in the accompanying drawings and described in this specification, but it will be understood that some of the features shown and described may be modified considerably without departing from the invention.

The machine described in detail is a small, light and, therefore, portable adding, subtracting and recording machine, here shown as hand driven but which may be driven by a small electric motor if desired. In general it is of the 10 key class of the type shown in United States Patent #1,899,444 to Thomas O. Mehan, wherein the keys set stops in a travelling stop carriage. While the present invention may be readily embodied in said machine with but slight changes in the existing structural features thereof, it should be understood that the invention may be embodied in other forms of computing machines, wherever found available. Two sets of register wheels in permanent mesh with each other are mounted in a cradle which is adapted to be revolved 180° for the purpose of bringing one set of wheels into engagement with the actuating racks for addition, and the other set of wheels into engagement with the same actuating racks for subtraction. Provision is made for positive and negative computation, the correct balance being automatically printed whether positive or negative. The transfer mechanism is of novel construction and contains provisions for precision and certainty of operation. The means for controlling the engagement and disengagement of the register in different sequences for different operations is novel and effective.

The machine may contain control keys for subtraction, total, sub-total, non-add and repeat, the last capable of giving multiplication rapidly. It also contains numerous interlocks and other safe guarding devices.

The invention has for its object to produce an improved computing machine in respect of the matters above indicated and of others which will be apparent from the following description.

In the accompanying drawings wherein like reference characters represent corresponding parts in the various views:

Fig. 3 is a fragmentary right hand elevation of the subtraction mechanism with the subtract key depressed for performing a subtraction operation but the mechanism otherwise normal.

Fig. 4 shows the same setting as Fig. 3 but with the parts as they appear at the end of the forward stroke of the operating mechanism during a listing operation of a subtracted amount.

Fig. 5 is an enlarged left hand elevation of the mechanism concerned in shifting the register into and out of mesh with the actuating racks.

Figure 6:
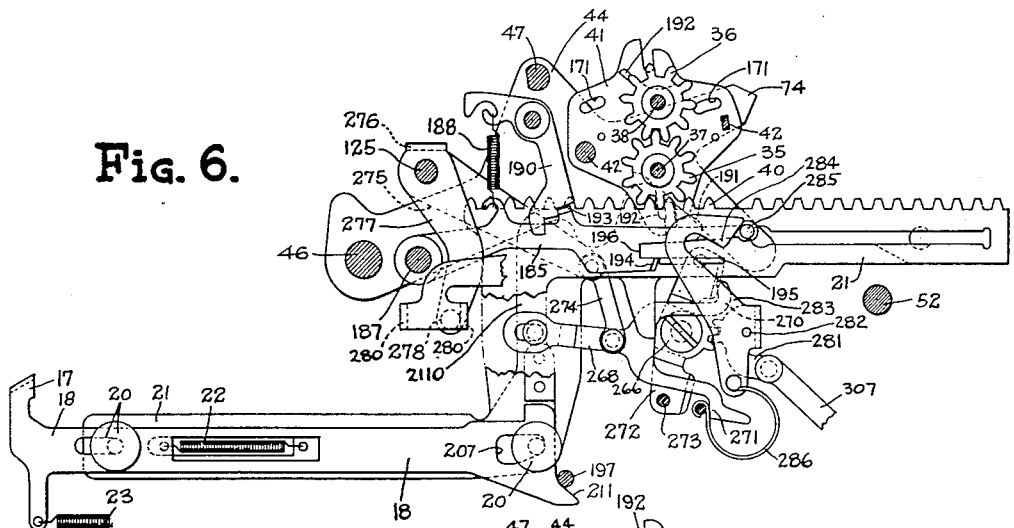
Figure 7:
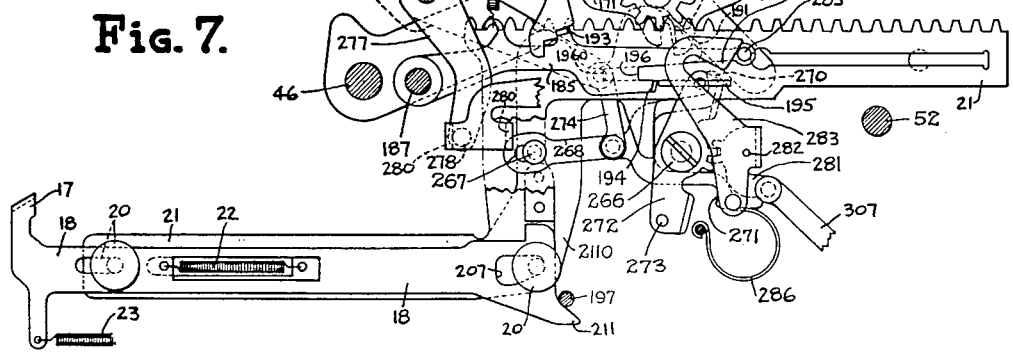
Figure 8:
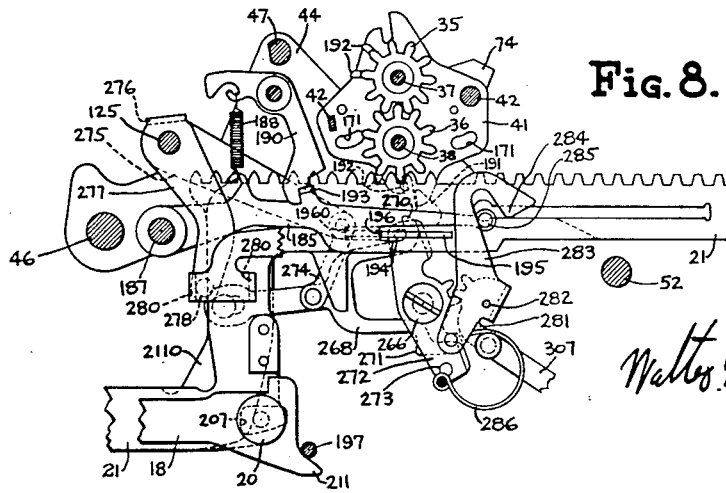

Figs. 6 to 8 are right hand views of the credit balance or negative total mechanism and register section with parts omitted or shown in section or broken away. In Fig. 6 the positive set of register wheels (adding wheels) is shown in mesh with the actuating racks, and the mechanism is otherwise normal; in Fig. 7 the negative set of register wheels (subtraction wheels) is shown in mesh with the actuating racks, but the mechanism is otherwise normal; and in Fig. 8 the setting is the same as Fig. 7 but shows the credit balance slide in the forward or carry position.

Figure 9:
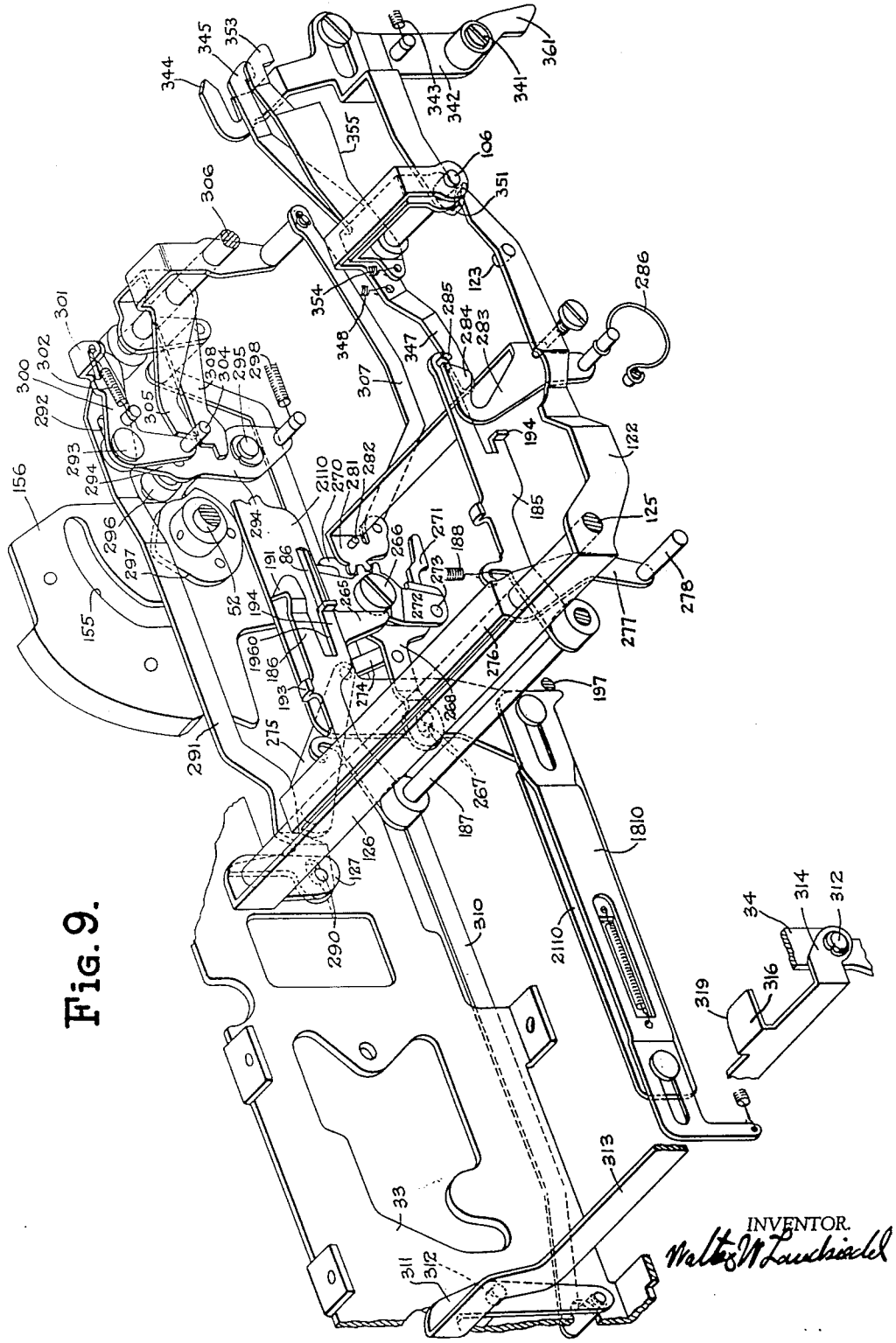

Fig. 9 is an isometric view illustrating the credit balance or negative total mechanism and associated parts.

Fig. 10 is a partial right hand elevation in section just inside the left hand frame of the center section showing the register in add position and out of mesh with the actuating racks.

Fig. 11 is a view similar to Fig. 10 with parts omitted and showing the register in subtract position and out of mesh with the actuating racks.

Fig. 12 is a fragmentary sectional view of the register mechanism and associated parts at the end of the forward stroke in the act of taking a negative total.

Fig. 13 is a fragmentary right hand end view of the register and associated parts, with the register in the position which it assumes when in engagement with the actuators and in subtract position.

Figs. 14, 15 and 16 are fragmentary views in vertical section and showing the subtract key and associated parts in different positions.

Fig. 17 is an enlarged detail view of one of the parts associated with the subtract key.

Fig. 18 is a perspective view of the automatic total controls and associated parts with parts broken away and other parts omitted for the sake of clearness.

Fig. 19 is a plan view of the keyboard.

Fig. 20 is a fragmentary right hand view of a portion of the credit balance mechanism, particularly of the means for automatically setting the machine for subtract before taking a negative total.

Figure 21:
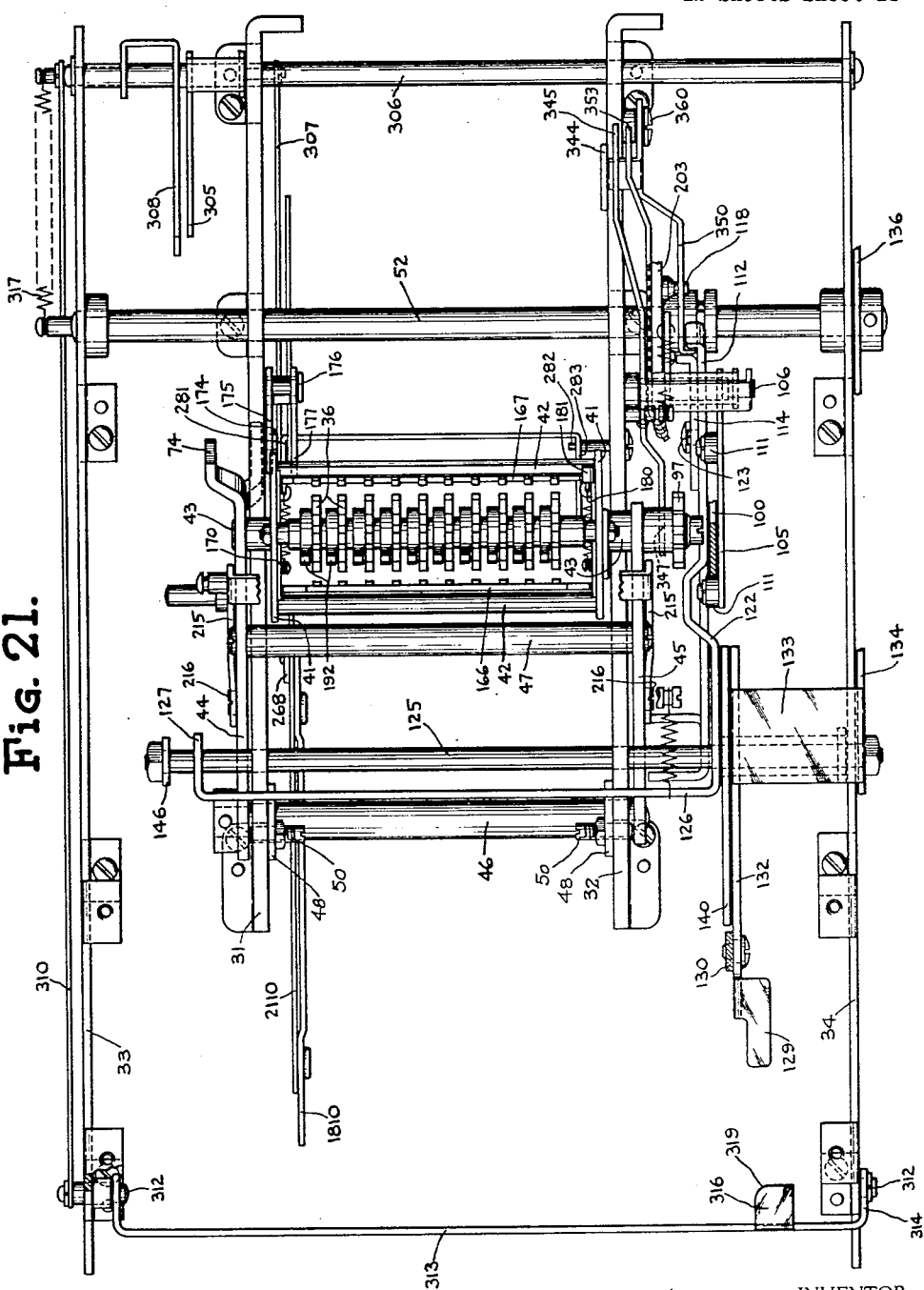

Fig. 21 is a partial plan view of some of the framing and some of the mechanism.

Figs. 22 and 23 are fragmentary views showing the connection between the subtract key and the automatic total-taking mechanism.

Figure 24:
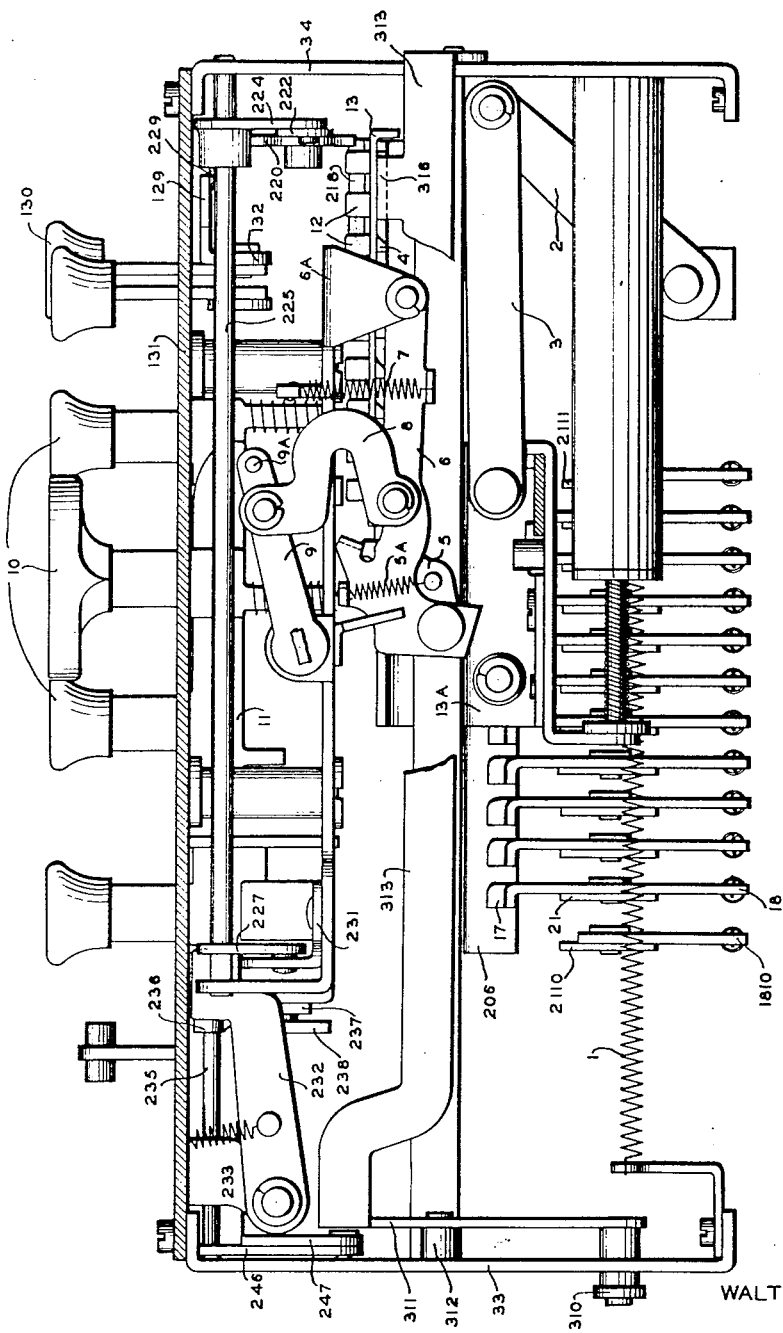

Fig. 24 is an enlarged front view of the machine with certain parts omitted for the sake of clearness.

General construction

The particular machine shown in the drawings is similar in most respects and is identical in its general organization and principle with that described in the above mentioned Mehan patent, which machine has for sometime been known commercially as the Monarch or Remington adding and listing machine; but in order to make room for the direct subtraction mechanism the machine has been somewhat enlarged.

Figure 1:
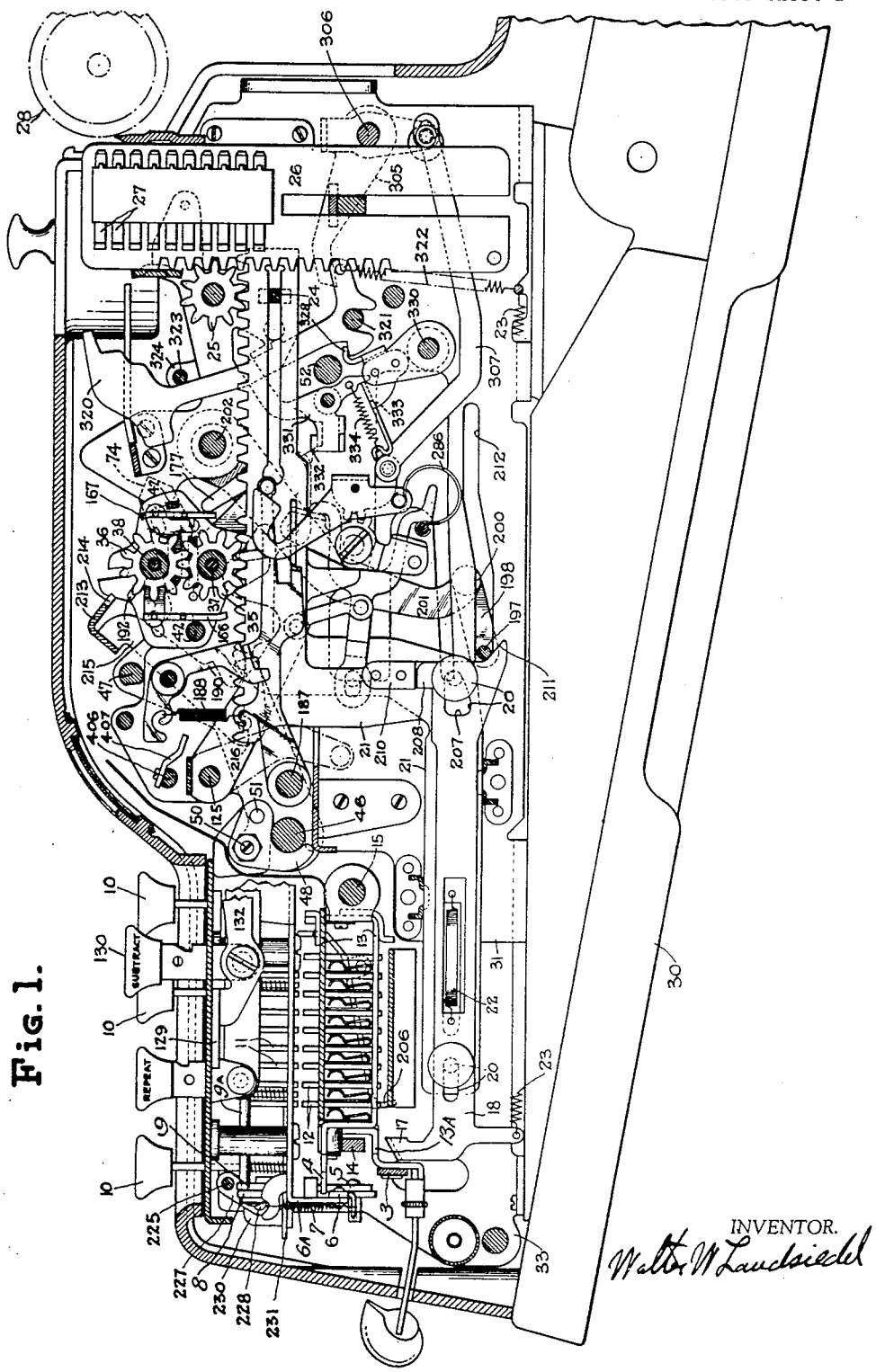
Fig. 1 is a front to rear vertical section through the machine, with the parts in normal position.

The machine comprises the usual ten numeral keys 10, Fig. 1, the stems 11 of which are adapted to set stops 12 in a step by step moving stop carriage 13, which carriage travels on rails 14 and 15 under the control of an escapement which is partially shown in Fig. 1 and designated 16. The escapement mechanism for controlling the movement of the stop carriage 13 may be the same as that disclosed in the above mentioned Mehan Patent 1,899,444. In a few details of construction, the escapement mechanism shown herein differs slightly from that shown by Mehan so that this portion of the machine will be briefly described. As shown in Fig. 24 the stop carriage 13 is urged towards the left of the machine by a spring 1 which acts upon the carriage through an intermediate connection consisting of an arm 2 and a link 3 connected to a plate 13A fast on the carriage 13. The upper end of the plate 13A is bent forwardly and is formed as a toothed rack 4 which cooperates with the well-known escapement controlling devices to limit the leftward movement of the carriage to one step upon each operation of a numeral key 10. Normally resting directly in front of one of the teeth on rack 4 is a pawl 5 pivotally mounted on the left-hand end of a lever 6 supported at its right-hand end, by a fixed bracket 6A. A spring 7 is provided to urge the lever 6 in a clockwise direction while another spring 5A, connecting the pawl 5 and the lever 6, serves to press the pawl in a counterclockwise direction into engagement with a bent over ear formed on the lever 6. A link 8 connects the lever 6 to a bail assembly comprising two arms 9 (one shown) and a connecting rod 9A. The stems 11 of the numeral keys 10 are formed with shoulders which overlie the rod 9A so that each time a numeral key is depressed the bail assembly comprising arms 9 and rod 9A is rocked downward in a clockwise direction. Through the link 8 this motion is imparted to the lever 6, causing the lever to move a short distance in a counter-clockwise direction. This motion of the lever 6 serves to move the pawl 5 downward out of engagement with the rack 4 whereupon the rack is permitted to move leftwardly until the tooth thereon which was previously engaged by the pawl comes to rest against the bent-over ear on lever 6 and over the nose of the pawl 5. This is not a full step of movement of the rock and the full step is not completed until the depressed numeral key is released. When this is done, the lever 6 and the bail assembly 9—9A rise to their normal positions thus moving the ear on lever 6 out of engagement with the tooth of the escapement rack 4. Since the pawl 5, at this time, underlies the rack tooth which it previously held engaged it is prevented from moving upward with the lever 6 so that the stop carriage 13 is free to travel leftward. Leftward movement of the rack 4 frees the pawl 5 allowing it to snap back to its original position where it engages the next succeeding tooth of the rack and holds the stop carriage in its new position. This escapement mechanism is basically the same as that disclosed in the cited Mehan patent and for a more detailed disclosure of this and other mechanisms pertaining to the pin carriage 13 reference may be made to that patent. The stops 12 when set are adapted to arrest ears 17 on slides 18 which latter are mounted by pin and slot connections 20 (see Fig. 1) on the usual horizontally movable differential slides 21. The slides 18 and 21 are connected as usual by a spring 22 for the purpose of transfer and these slides are urged towards the rear of the machine by actuating springs 23. The slides 21 have their rear parts offset upward as usual and guided by a comb bar 24. Rack teeth on these bars mesh with pinions 25 which also mesh with vertical rack teeth on the type carriers 26 having slideable type 27 for cooperation with platen 28.

The framework of the machine comprises a base casting 30, here shown so shaped as to tilt the rear end of the machine up somewhat, which is sometimes convenient in operation and which also serves to furnish room for a motor at the rear of the machine if desired. The mechanism is mostly supported on an inner frame comprising frame plates 31 and 32, Figs. 10 and 21, having ears which are screwed to the base plate and said upright plates 31 and 32 being united by various cross members. At some distance outside of these plates there are also a left hand vertical frame plate 33 and a right hand plate 34, these being mainly for supporting controls, etc. The slides 21, type bars 26 and the computing mechanism are mounted between the plates 31 and 32.

Register

The register mechanism, shown in Figs. 1, 6, 7, 8, 10 and 11, comprises in each denomination two register wheels 35 and 36 in constant mesh, the former journaled on a shaft 37 and the latter on a shaft 38. In adding operations the wheels 35 mesh with rack teeth 40 on the slides 21 as shown, for example, in Figs. 1 and 6, and in subtracting operations the wheels 36 mesh with said racks (Fig. 7); and we may, therefore, refer to the wheels 35 and 36 as the adding wheels and the subtracting wheels, respectively.

The shafts 37 and 38 are rigidly mounted in a register frame consisting of two end plates 41 secured together by two frame rods or bars 42. Trunnions 43, Figs. 5 and 21, projecting from the plates 41 are journaled in side-arms 44 and 45 of a cradle which also comprises a rock shaft 46 to which the arms 44 and 45 are rigidly secured. Said cradle is stiffened by a cross bar 47. The shaft 46 is journaled in the frame plates 31 and 32, and it is by a rocking of this cradle that the register wheels are moved into and out of mesh with the racks.

The manner in which the register cradle is pivoted is shown in Figs. 5 and 21. Each of the plates 31 and 32 has a notch or open slot into which the shaft 46 is inserted from the front and a clip 48 is secured to each of the plates 31 and 32 by a screw 50 and extruded pin 51, said clip closing the open end of the slot. The construction is such that the cradle and the entire register assembly can be removed from the machine bodily by merely loosening these two screws 50 and removing the clips.

*Register engaging and disengaging mechanism*

The operating mechanism comprises the usual main rock shaft 52, which carries certain cams and other operating devices, which shaft may be rocked by any suitable means such as a handle or motor. The means for moving the register into and out of mesh with the racks is best shown in Figs. 5 and 18 which are views of the mechanism as seen from the left and with the outside frame plate 33 removed. Pivoted at 53 to the left hand arm 44 of the register cradle is a plate-like link 54 of special shape, somewhat like an inverted Y. The crotch at the lower end of this link comprises two shallow slots 55 and 56 for the reception of pins 57 and 58 projecting rightward (Fig. 18) from a plate 60 pivoted on a stud 61 projecting from an offset arm 62 of the left hand frame plate 31. Said plate 60 carries on its left hand face two pins 63 and 64 which project through suitable openings in a bracket 65 secured to the base casting of the machine and which bracket also helps to support the stud 61. The end crotch or notch of the link 54 is of a sort of diamond shape as shown in Fig. 5 so as to form cam edges which cooperate with the pins 57 and 58 to guide the latter into the notches or slots 55 and 56. The link is normally held by a certain spring, to be hereinafter described, in its forward position with the pin 58 in the notch 56 so that if the plate 60 be rocked clockwise in Fig. 5 the register wheels will be lifted out of mesh with the racks on slides 21. Such rocking of the plate 60 is normally effected by a wipe pawl 66 of the general type usual in these machines, said pawl being pivoted to an arm 69 rigidly projecting from the main shaft. Said wipe pawl has a projecting finger 67 and two shoulders, one, 68, for cooperation with the pin 64 and another, 70, for cooperation with the pin 63. The pawl is influenced by the usual spring 71 but it is normally rocked clockwise against said spring by the action of a branch 72 thereof on a stud 73 projecting from the bracket 65. On the forward (clockwise) stroke of the shaft 52 as the arm 69 descends and the branch or finger 72 moves away from the stud 73 the wipe pawl swings counter-clockwise and the shoulder 68 acting on pin 64 rocks plate 60 and forces the register cradle upward to disengaging position, all in the first part of the stroke. After this the pawl 66 automatically reverses by wiping over the pin 63 and at the first part of the return stroke the shoulder 70 acting on said pin rotates the plate 60 counter clockwise and draws the register wheels into mesh. In order to take totals the plate link 54 is swung clockwise, Fig. 5, whereupon the pin 57 will be cammed into the notch 55 and pin 64 will be swung to a position where it will not be further moved by the pawl 66 on the forward stroke but the pin 63 will be engaged at the beginning of the return stroke and rock the plate 60 counter clockwise. As the pin 57 is at the right of the pivot of said plate this motion will swing the register wheels out of mesh at the beginning of the return stroke. This mechanism is only briefly described because it is of a familiar type. The means for swinging the plate 54 to its different positions will be described hereinafter.

As best shown in Fig. 5 the arm 44 of the register cradle terminates in a V tooth 74 cooperating with a detent lever 75 pivoted on a stud 76 projecting from the frame plate 31, said detent being drawn into engagement with tooth 74 by a spring 77. The detent is made yoke shaped as shown so as to afford a long bearing on the stud 76. Its V-shaped tooth 78 serves yieldingly to hold the cradle in either of its two positions. The motion of said cradle downward is limited by the cross bar 47 striking the top edges of the frame plates 31 and 32. In order to provide for adjustment this frame bar has eccentric trunnions projecting therefrom through the arms 44 and 45 so that it can be adjusted by rotating it and it can be secured in its adjusted position by tightening the screw 80, Fig. 5, which is threaded into the end of the bar. The motion of the cradle in the upward direction is limited by one of its arms striking a washer or roller 81 conveniently mounted on the cross rod 82. Adjustment in this instance is afforded by the provision of washers of different diameters, a suitable one being selected in each instance.

It is desirable that in the course of the forward stroke and also of the return stroke of the main shaft the register be positively held in its upper or lower position as the case may be, and this is effected by positively locking the detent 75. To this end said detent has a rearwardly projecting arm 83 having a stud on which is mounted a roller 84. Fast to the main shaft 52 is a plate or cam 85 having a concentric edge 86 which is so situated that it passes under the roller 84 in the early part of the forward stroke of the shaft after the shifting mechanism above described has finished its operation. If the register cradle has not been firmly set against its limit stop this concentric edge acting on the roller 84 will force the detent into snug locking position and force the register cradle into accurate position. It is especially desirable that said cradle be firmly and accurately positioned at the end of the forward stroke and yet it must be promptly released at the very beginning of the return stroke in order that the cradle may be shifted at that time. This condition is brought about as follows: The concentric edge 86 is comparatively short and soon passes out from under the roller 84. A member 87 is pivotally mounted on the shaft 52 by the side of the plate 85 and is permitted a limited rocking motion relative to said plate by a stud 88 projecting from the said plate 85 into a concentric slot 90 in the plate 87. The latter plate is operatively connected with the plate 85 by by means of a friction spring not shown. Said plate 87 has a finger 91 including a shoulder 92 which latter as the parts swing towards the right, in Fig. 5, passes under a nose 93 on the arm 83 and positively locks said arm against downward motion, at the same time arresting the rocking motion of the plate 87 and forcing the plate 85 to finish its swing, leaving the plate 87 stationary. At the beginning of the return stroke, however, the shoulder 92 immediately moves from under the nose 93 leaving the register frame free to be shifted. The counter-clockwise motion of the plate 87, is, however, presently arrested by a finger 94 thereof engaging a hub on the stud 76. There is thus left an interval after the shoulder 92 leaves the nose 93 when the detent 75 is free to be snapped counter-clockwise and back immediately following which the concentric edge 86 again passes under the roller 84 and assures that the detent 75 is snugly positioned.

Register reversing mechanism

When setting the machine for subtraction the register frame 41, etc., is rocked through 180° from the adding position shown in Fig. 10 to the subtracting position shown in Fig. 11. This has the advantage that the subtract wheels engage the same tooth of the rack 40 as the add wheels, which considerably simplifies the problem of transfer. This must obviously be done in the course of the forward stroke of the operating shaft after the register has been lifted out of mesh and before it is again thrown into mesh at the beginning of the return stroke. As shown in Fig. 10 each of the end plates 41 of the cradle has two notches 95 diametrically opposite each other and lying between two projecting ears or lugs 99 and 99A of the plate. In each instance one of these projecting lugs 99 is longer than the other (99A) and when the register is in its upper position the longer lugs 99 are adapted to be arrested by respective flanges 96 projecting from little brackets fastened to the plates 31 and 32. With the parts in adding position, shown in Fig. 10, when the cradle swings down about the shaft 46 the lower slot 95 will embrace this flange and accurately position the register frame. To set the machine for subtraction said frame is rotated clockwise from the position in Fig. 10 to that in Fig. 11 and on the subsequent depression of the register the other slot 95 will accurately position the parts. In order to rotate the register frame as above mentioned, the right hand one of the trunnions 43 is prolonged beyond the arm 45 (Fig. 21) and has mounted thereon a pinion 97. When the register is lifted out of mesh this pinion (Fig. 4) engages an internal segmental rack 98 which is secured to the end of an arm 100 which arm is pivoted at its lower end to a U shaped bracket 101 secured to the base casting 30. As here shown the T-shaped arm 100 is made with two holes into which project extrusions 102 forced out of the rack 98 which latter is secured in position by a screw 103, the extrusions locating the rack with precision. By this construction the rack can be removed by simply removing the one screw 103.

When the register wheels are in mesh with their racks 40 the pinion 97 is out of mesh with its rack 98 and it is important that the latter be not accidently displaced from its end position during this time as otherwise the pinion 97 would move into engagement with the wrong tooth of said rack. To this end the arm 100 has a lug or flange 104 secured to its left hand face in such a position that when the pinion 97 is out of mesh, said flange stands opposite a hub or collar on the trunnion on which this pinion is mounted and prevents rocking of the arm 100 and it will do this in either extreme position of said arm, the flange in one instance being in front of said trunnion and in the other instance being behind it. When the pinion moves up into mesh as shown in Fig. 4 this flange comes beneath the collar on the trunnion and not only permits the arm to swing but also during such swinging positively holds the pinion in engagement. The arm 100 is influenced in its movements by a detent arm 105 pivoted on a stud 106 projecting from the frame plate 32. Said detent has a V-shaped tooth 107 which by means of a spring 108 is pressed into engagement with a roller 110 on the arm 100.

The spring 108 is sufficiently strong so that when the roller 110 passes the apex of tooth 107 said spring tends to cause the arm to complete its motion with a snap. The motion of the arm is limited in each direction by a collar or roller 111 on the detent arm there being two such collars, one in front of and the other behind said arm.

In the present machine the mechanism is set for subtraction in computing operations under the control of a subtract key, and on a blank stroke preparatory to total-taking it is also sometimes set for subtraction under the control of certain mechanism due to the fact that the register indicates a negative balance; and in computing operations the mechanism is automatically returned to adding condition upon the restoration of the subtract key and also sometimes on a blank stroke preparatory to total-taking due to the register indicating a positive total. In any of these events the arm 100 is actuated by a slide 112 having suitable slots by which it is guided for front and rear sliding motion, one of said slots being guided by the main shaft 52 and the other by a frame rod 113. The slide 112 is operatively connected with the arm 100 by pin and slot.

Figure 2:
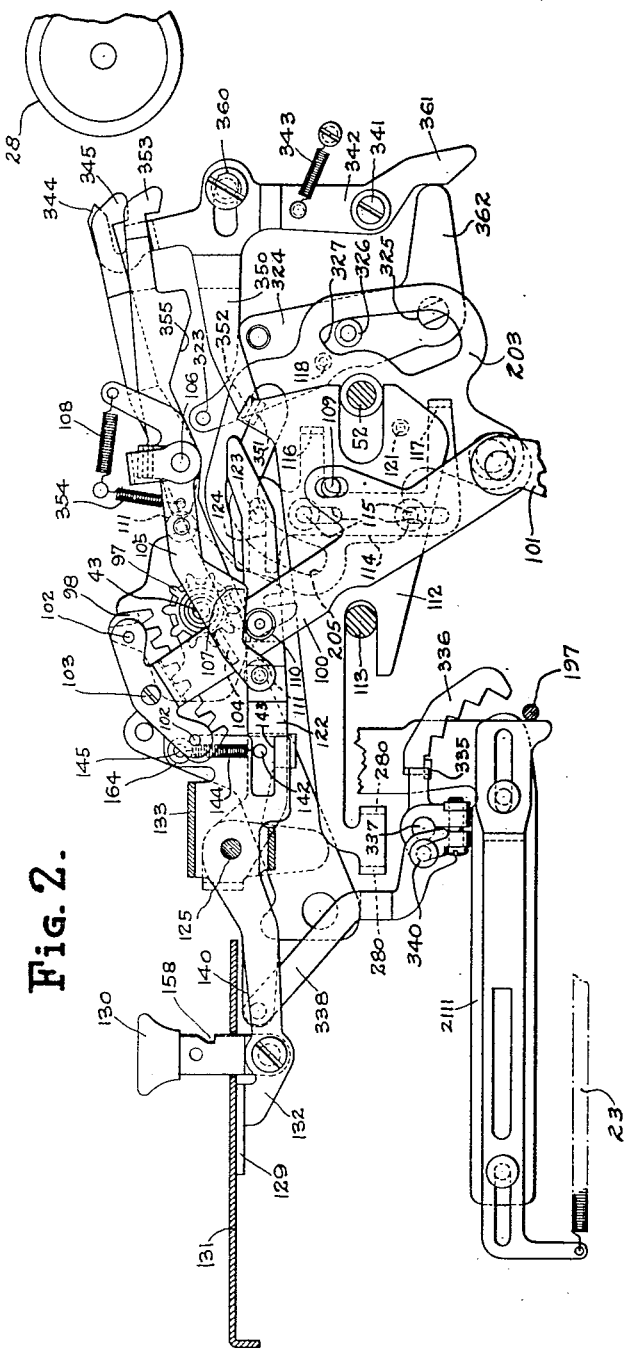
Fig. 2 is a fragmentary right hand elevation illustrating the subtraction mechanism and some associated parts, the subtraction key and associated parts being in normal position.

In order to operate the subtract slide 112 in one direction or the other as required during the proper part of the forward stroke of the main shaft said slide has a vertically slideable piece 114 mounted thereon by pin and slot connections 115, Figs. 2, 4 and 14, said piece 114 having formed thereon two ears 116 and 117. In adding operations the slide 114 occupies its lower position, shown in Fig. 2, and in that position the ear 116 lies in the path of a stud 118 on a main actuating cam 203 fast on the main shaft 52 so that on the forward stroke of said shaft and cam said stud will force the slide 112 to its forward position carrying with it the arm 100 and setting the mechanism for addition. In this position the ear 117 is beneath the path of another stud 121 fast on the cam 203. In order to set the machine for subtraction the slide 114 is moved to its upper position shown in Fig. 3 in which the ear 116 is out of the path of the stud 118 and the ear 117 is in the path of the stud 121 which stud being below the shaft 52 moves rearwardly during the forward stroke of said shaft and carries with it the slides 114 and 112 setting these to their rear positions and setting the register mechanism for subtraction, as shown in Fig. 4, which figure represents the position of the parts at the end of the forward stroke of the main shaft. It will be understood that the register will be dropped into mesh with the racks at the first part of the return stroke of the shaft. The slide 112 and arm 100 will remain in the position shown in Fig. 4 as long as the machine is set for subtraction.

The control slide 114 is set to its two positions by a lever 122 having a stud 123 playing in a horizontal slot 124 in the slide 114, said lever being pivoted on the subtraction shaft 125.

As best shown in Fig. 9 this lever 122 is one arm of a bail, the bar 126 of which extends across the machine to the left hand side thereof and is integral with a depending arm 127 which is also pivoted on the shaft 125.

Subtract key

The subtract key 130 is connected with the lever 122 in a manner which will now be described, Figs. 3, 4 and 14–17. The stem of said key is guided in a slot of the top plate 131 of the keyboard and is pivoted to a key lever 132 of peculiar construction. As shown in Fig. 14 this key lever is made of a piece of sheet metal formed or bent into two vertical planes connected by a yoke bar 133, the key 130 being pivoted on the left hand one of these vertical portions. The right hand arm of the key lever is rigidly secured to the shaft 125 so as to cause said shaft to rock with the lever and this right hand portion of the lever is prolonged downwardly and rearwardly into an arm 134, the free end of which has a tongue 135 formed off therefrom to the left of the general plane of the arm. On the main shaft 52 there is mounted a disc 136 having an arcuate flange 137 normally terminating just above the tongue 135. The construction is such that with the subtract key in the inactive position, shown in Fig. 14, if said main shaft be rocked the flange 137 will move in behind the tongue 135 and prevent depression of the subtract key until the completion of the cycle. If, however, the subtract key be first depressed, as shown in Fig. 15, and the main shaft be then actuated the tongue 135 will be behind the flange 137 and the subtract key will be positively held in its depressed position until the end of the cycle. Also if the subtract key be only partially depressed the tongue 135 will be in the path of the flange 137 and the main shaft will be locked against operation.

Referring to Fig. 4, the arm 122 rests on an ear 138 bent off from a lever 140 pivoted on the shaft 125, at two points connected by a yoke piece 141. The lever 140 lies to the left of the key lever 132 and between said lever and the lever 122 and it has a stud 142 projecting through a slot 143 in the key lever 132 which slot is of a width greater than the diameter of the stud. The stud is normally held against the upper edge of the slot by a spring 144 connected to a stud 145 on the key lever 132, as shown in Fig. 14. The lever 140, Figs. 3 and 4, is extended towards the front of the machine for a purpose to be hereinafter referred to. The lever 122 is prolonged rearwardly so as to limit on a collar on the stud 106 hereinbefore referred to, as shown in Fig. 4, so that in case the subtract key is down the spring 144 can yield without putting any binding friction on the stud 123 and slot 124.

In order to latch the key 130 in its depressed position an arm 146, fast on the left hand end of the shaft 125 as shown in Figs. 14-16, has an ear cooperating with a latch 147 pivoted on a fixed stud 148 and drawn upward by a spring 150. The parts are shown in normal position in Fig. 14 and the key 130 in its ordinary depressed position in Fig. 15, where it will be held by the latch 147. In order to release this latch its sloping upper edge cooperates with a stud 151 projecting from a release slide 152 mounted on fixed studs 148 and 153 on the left hand frame plate 31. At its rear end this slide carries a follower roller 154 riding in a cam slot 155 in a cam disc 156 fast on the main shaft 52. This cam is concentric throughout most of its length but at its forward end it inclines inward towards the center of the shaft. The construction is such that soon after the shaft 52 begins to turn the slide 152 will be moved towards the front of the machine and release the latch as shown in dotted lines in Fig. 15. By this time, however, the flange 137 will have moved in front of the tongue 135 so that the key will be held down until the end of the cycle when it will be automatically returned to normal position by a spring 157, Fig. 14 acting on the arm 134.

Provision is made for locking the key 130 down in such a way that it will remain down for a succession of subtracting operations until released by hand. To this end the stem of the key is made with a notch 158 which can be caught under the keyboard plate 131 by pressing the key down an extra distance and pushing it rearward with the finger, as shown in Fig. 16. In this operation the spring 144 is further stretched.

It is desirable to have the spring 144 interposed between key 130 and the lever 140 so that the key can be pushed down and the arm 122 accurately positioned without the necessity of great precision in the depth to which the key is held by the latch 147 but it is also desirable that when the key reaches the ordinary end of its stroke, as shown in Fig. 15, the finger of the operator encounters sufficient resistance so that he will not unintentionally push the key on down to its permanent set position. To this end an extra piece 160, Fig. 17, is inserted which piece has the yoke form shown and is pivoted on the shaft 125 between the two arms of the lever 132. The right hand arm of this piece 160 is connected with a stud 162 on the key lever 132 by a spring 161 much stiffer than the spring 144. The left hand arm of the piece 160 has a shoulder 163 that normally limits on an adjustment roller 164 mounted on the spring stud 145 which shoulder normally takes the tension of the spring 161 which, therefore, ordinarily is idle. The left hand branch of the piece 160 also has an arm 165 projecting under the stud 142 and normally at a higher level than the bottom edge of the slot 143 in the lever 132, but out of contact with the stud. The construction is such that when the key is depressed by the usual light tap, the arm 122 is arrested at 106, the spring 144 yields slightly until the key is arrested by the arm 165 striking the stud 142, further motion being resisted by the stiff spring 161. This will arrest any ordinary tap on the key but will permit the key to be depressed to the Fig. 16 position by the exertion of sufficient force to stretch said spring. This key depression is positively arrested by the lower finger of the key lever 132 striking the stud 142. Said finger may be adjusted by bending it.

*Register wheel detent mechanism*

Some details of the registering mechanism remain to be described. In order to retain the register wheels accurately and positively in position when out of mesh with the racks 40 two detents or locking plates 166 and 167, Figs. 10, 11, 13 and 21, are provided, each made with trunnions 168 by which it is pivoted in the end plates 41 of the register frame, these locking plates being provided with a series of teeth, one for each register wheel. The plate 166 engages the add pinions 35 and the plate 167 the subtract pinions 36. These plates may be mere detents, but in the present instance the plate 167 is so positioned that it acts on the teeth of the pinion 36 like a pawl, one of said teeth contacting with the end of the detent so as positively to prevent clockwise rotation of the pinion. The detent 166 is likewise so disposed that it engages the teeth of each pinion 35 after the fashion of a pawl, positively preventing clockwise rotation of those pinions. As counter clockwise rotation of one pinion involves clockwise rotation of the other, it will be seen that the pinions are positively locked against rotation in both directions. Meanwhile, each detent is spring pressed towards the pinion and acts on one tooth of the pinion by spring pressure tending to rotate the pinion counter clockwise until positively arrested by the end of the detent. It will be seen that these two pawls spring pressed against the wheels tend to rotate the wheels into exact position and positively lock them in such position.

Against the left hand plate 41 the two detents are connected by a link 170, said link pivoted to trunnion-like projections on the ends of the detent plates which projections extend on through slots 171 in the end plates 41 (see Figs. 6 and 13) so as to limit the extent of rotation of the detents. This link 170 is influenced by a spring 172 attached to a stud 173 on the plate 41 and tending to press the detents into engagement with the wheels.

In order to release the detents when the wheels are moved into engagement the following devices are provided, as shown in Figs. 10 and 11: A stud 174 projects from an arm of the left hand cradle arm 44 into a slot in a lever arm 175, which is one branch of a bail shaped piece pivoted on a stud 176 projecting from the left hand frame plate 31. The other branch of this bail shaped member is prolonged into an arm 177 which is in position to engage a tail or arm 178 projecting from which ever one of the two detent plates 166—167 happens to be at the rear side of the assembly at the time. When the parts are in adding position, as shown in Fig. 10, the tail 178 of the detent 167 is in this position and when the parts are in the subtract position, shown in Fig. 11, it is the corresponding part of the detent 166. The construction is such that when the cradle frame 43, 44 is depressed to engage the register wheels the arm 177 rocks counter clockwise and swings the detents out of engagement, as shown in Fig. 1. The proportions of the parts are such that the motion of the arm 177 is somewhat rapid as compared to that of the cradle frame and there is lost motion between said arm and the tail 178 so that the detents are not released until the register wheels are sufficiently engaged with the racks and on the up stroke of the cradle the detents are thrown in before register wheels are free of the racks.

Preferably there is in the right hand end of the register frame another slide corresponding to the slide 170 and which in Fig. 13 is lettered 180. The associated parts are lettered similarly to Fig. 10, the slide 180 being in most respects similar to the slide 170. It will be recalled that when the register frame is shifted from adding to subtracting position the detent 105, Figs. 3 and 4, by its inclined tooth or nose 107 tends to complete the semi-rotation of the register frame with something of a snap under spring pressure. In this case the frame is arrested by the ear 99 striking the flange 96. The parts are thus arrested with something of a blow which would tend to throw the detents 166 and 167 momentarily out of engagement. In order positively to prevent this, the slide 180 is made with an extension 181 from which an ear 182 is bent off. On the frame 32 there is mounted a bracket 183 having a nose or tooth 184 projecting rearward therefrom in such position that when the rotation of the register is arrested in subtract position, this nose stands directly in front of the ear 182 and positively prevents the slide 180 from forward motion and, therefore, prevents the detents from being jarred loose. When the register frame is depressed to bring the register wheels into engagement with the racks the ear 182 moves to a position below the nose 184, as shown in Fig. 13, so that the detents are free to be released by the arm 177. When the register frame is rotated it is in its upper position, where the nose 184 stands directly in front of the ear 182. When the register frame is rotated from subtract to add position it is again arrested with a blow, but in this direction the momentum tends to press the detents against the wheels.

*Transfer mechanism*

The transfer mechanism employed in the present machine to transfer from one wheel to the next one of higher order includes transfer pawls 179 (Fig. 12) essentially similar to those heretofore used in this machine. The drawings show two modified pawls, one, 185 (Figs. 6, 7 and 9) for controlling the wheel of lowest order and another, 186 (Fig. 9) controlled by the wheel of highest order. These pawls are pivoted on a transverse shaft 187 and are drawn upward by springs 188, each against the end of a detent 190, Fig. 6, said detent being urged counter clockwise by the spring 188. At its free end each of these pawls except pawl 185 has a cam tooth 191 adapted when a register wheel 35 pases from 9 to 0 or a register wheel 36 passes from 0 to 9 to be depressed by the carry or transfer tooth 192, Fig. 6, of which each register wheel carries one at the left of its gear teeth. These transfer teeth project radially beyond the gear teeth as shown. When one of the transfer pawls is depressed by a transfer tooth to the position shown in Fig. 8 the detent 190 snaps over the cooperating lug 193 of the pawl and retains it in depressed position until released at a later period in the cycle. When the pawl is in its upper position a finger 194 thereof arrests a flange 195 secured to the right hand side of the next higher rack 21 arresting said rack one unit short of the point to which the slide 18 on said rack is restored. When the pawl is in its lower position, shown in Fig. 8, this flange 195 and the rack to which it is attached can move an extra unit distance until arrested by the end 196 of the notch above the finger 194. This is substantially the ordinary transfer mechanism of this machine.

In the present case the transfer mechanism has been modified in a manner that permits of more rapid operation by motor than heretofore. The slides 18 and 21 are restored to their normal forward positions by a bail bar 197. This bail bar, as best shown in Fig. 1, is secured to two arms 198 having the effect of links pivoted at 200 to arms 201 rigidly mounted on a shaft 202, said arms and shaft being rocked at the appropriate time by the cam 203 on shaft 52, Figs. 3 and 4. In Fig. 1 the left hand arm 201 is shown. The right hand arm is not shown in the drawings, but referring to Figs. 3 and 4 it lies between the cam 203 and the inner right hand frame plate 32, and it has a roller 204, shown only in dot and dash lines, and playing in a slot 205 in the cam 203. It will be noted that this slot is first concentric to allow time for other operations on the forward stroke of the main shaft and that the slot then inclines towards the center of the shaft to draw the bail bar 197 towards the rear of the machine, the last end of the slot constituting a short dwell. All this mechanism has been only indicated in the drawings because it is of familiar construction.

Register wheel actuating mechanism

In the machine as heretofore constructed the ears 17 projected from the slides 21 themselves, the slide corresponding to the slide 18, being merely a device for direct cooperation with the restoring bail 197 and connected with the main slide 21 by a spring corresponding to the spring 22. It was found that in very rapid operation when the ear 17 had been arrested by one of the stops 12 and the slides were restored by bar 197 that the spring 22 would be stretched and the slide 21 would lag behind the slide 18 with the result that at the instant when the bar 197 had reached its return position the ear 17 had not yet quite been restored. Meanwhile the mechanism had begun the return motion of the stop carriage 13, which carriage has among other things the usual flange stop plate 206, Fig. 1, arranged at the left of the set of stops to prevent operation of those differential slides of orders higher than any in the number being added at the moment. If any slide 21 was a little sluggish in returning due to the stretching of the spring 22 its ear 17 occasionally, in very rapid motor operation, was caught in the path of the returning flange 206 and disarranged the operation of the machine. In order to prevent this trouble and thereby to adapt the machine for more rapid operation than heretofore, this ear 17 has been put on the slide 18 itself which is prolonged forward for the purpose and the ear is, therefore, positively restored to normal position at the proper time. This change made it necessary to provide against another possible misoperation due to speed. On the rearward stroke of these differential slides the spring 22 relaxes so that theoretically in the first part of the rearward stroke the slide 18 moves relative to the slide 21 a distance of one tooth space. As a result, in case of rapid operation, when the ear 17 is arrested by one of the stops 12, the slide 21 may move on rearward by momentum, momentarily stretching the spring 22. There may, therefore, be a little vibration of the rack bar 21 before it settles into its proper position. This would do no harm except in the case of the highest digits, especially 9. Almost immediately after the slide 18 reaches the 9 position the register is depressed into engagement with the racks, and if at that time the rack was in vibration a misoperation might result. In order to prevent this the following construction has been adopted: The spring 23 is attached to a depending arm of the slide 18 itself so that once the ear 17 is arrested by a stop a moment of force is created tending to rock the rear end of slide 18 upward. The slot 207 in the rear end of said slide, which cooperates with a stud 20 on slide 21, has been widened at its forward end so as to permit of such a rising action; and the rear end of said slide has been prolonged upward forming a shouldered lug 208 which normally lies under a flat piece 210 of sheet metal riveted to the side of the bar 21. The construction is such that when the bar 197 starts rearward the tension of the spring 22 will cause the slide 18 to move rearward one step independently of the slide 21, bringing the lug 208 into such a position that its forward edge is back of the rear edge of the plate 210; and the rotating tendency of the spring 23 acts to lift the rear end of the slide 18 so that the forward edge of the lug 208 is raised into locking engagement with the rear edge of the plate 210 and the two bars 18 and 21 are for the moment positively locked together and the overthrow of the rack 21 by momentum is positively prevented.

It is, of course, necessary on the return stroke of the parts to release the locking engagement between the two plates. To that end the lower rear part of the slide 18 is prolonged rearward making an inclined edge 211 which, as shown in Fig. 1, is the part that is directly engaged by the bar 197, the effect being said bar has a camming action on the slide 18 to depress it out of engagement with the plate 210 and allow the parts to be restored to the normal position shown in Fig. 1. However, the engagement of the bar 197 with the inclined edge 211 might tend to prevent the interlocking action desired. It will be recalled that the overthrow of the bar 21 is injurious only in the latter part of the stroke. The guide slots 212 in which the bar 197 travels are, therefore, made of the shape shown in Fig. 1, its forward end being at a sufficiently low level to cause the bar 197 to engage the incline 211 but the rear part of the slot being at a higher level so as to move said bar upward to engage the vertical rear edges of the slides 18 so as not to interfere with their upward interlocking motion.

The above described differential mechanism is claimed in applicant's copending application S. N. 73,020, filed April 6, 1936.

Zero stop

In the machine as heretofore constructed totals have been taken by having the transfer tooth 192 arrested on the rearward stroke of the bar 21 by the abrupt forward edge of the lug 191 of the transfer pawl. This is a practical method of taking the total, but it requires a high degree of precision in the mechanism. When the wheel stands at zero and is moved down into the rack, the transfer tooth 192 moves down just in front of the abrupt face of the lug 191 of the pawl. Unless there is sufficient clearance between the tooth and lug, a slight error in the position of the wheel would cause the tooth during such motion to strike on top of the lug and trip the transfer pawl and cause an erroneous transfer. It is common practice to leave between the tooth and lug, when the wheels are in engagement, a theoretical clearance of about .010 of an inch. An error of a little more than that in the setting of the register wheels would, therefore, cause an erroneous transfer. Where two wheels in mesh are provided, the liability to error in the positioning of the wheels is increased. The machine would be much more reliable if the clearance between the tooth and the lug was made materially greater than .010. However, if this were done then in taking a total the rack 21 would have to move forward beyond its proper position an amount equal to the amount of the clearance and the total would, therefore, be printed that much above the ordinary line of printing. In the particular machine described in the drawings this clearance has been increased to about .040, thus entirely eliminating the danger of error above mentioned; and in taking totals the wheels are not arrested by the transfer pawls at all but are arrested by a separate device. The means for arresting the register wheels at zero in total-taking comprises a bar 213, Figs. 1, 5 and 18, said bar having a series of teeth 214 on its lower edge for engagement with the transfer teeth 192 but out of the planes of the gear teeth. This plate is in effect a bail bar, the arms 215 of the bail being pivoted to the arms 44 and 45 of the cradle on pivot screws 216. The left hand one of these arms 215 has a radial slot into which a stud 217 projects from an arm of the plate link 54 which regulates the engagement and disengagement of the register. The construction is such that when said link 54 is in its forward or computing position, shown in Fig. 5, the bar 213 is held up in the position shown in Figs. 1 and 5 out of engagement with the register wheels; but when the link 54 is swung to its rear position for the purpose of taking a total the bar 213 is rocked downward until its teeth 214 are in the path of movement of the transfer teeth 192 of whichever set of register wheels 35 or 36 is at the time out of engagement with the racks. When the racks are moved towards the front of the machine the wheels that are in engagement with it are turned clockwise and those that are out of engagement are turned counterclockwise until their transfer teeth are arrested in exact zero position by these teeth 214 and entirely independently of the transfer pawls.

In an algebraic register, positive 0 is the same as negative 9 and vice versa; negative 0 is the same as positive 9. In the described arrangement, positive totals are taken with the add wheels 35 in engagement with the racks, by arresting the subtract wheels 36 at 9; and negative totals are taken with the subtract wheels 36 in engagement, by arresting the add wheels 35 at 9. In short both kinds of totals are taken by the use of the same stop bail 213 which arrests in 9 position, the set of register wheels which, at the time is out of engagement with the actuators.

*Total taking controls*

Totals are taken automatically without the use of a total key by merely giving two strokes to the main shaft, 52, the first being a blank stroke and the second the total stroke. Mechanism for this purpose is described in the prior application of Thomas O. Mehan, filed May 15, 1935, Serial No. 21,609, now Patent No. 2,114,604, issued April 19, 1938. The total-taking mechanism in the present machine, shown in Figure 18, resembles that described in the Mehan application but differs from it in some respects.

In order to distinguish a blank stroke from a computing stroke the stop carriage 13 has attached to its upper surface, at about the rear right hand corner, a small sheet metal flange or bracket 218 (Fig. 18) adapted to cooperate with a detent 220, pivoted at 221 to a link 222, extending horizontally front and rear. At its rear end this link is guided by a fixed stud playing in a slot 223 in the link and at its forward end it is pivoted to an arm 224, fixed on a transverse rock shaft, 225, lying just beneath the keyboard plate 131 in a location shown in Figure 1. The detent 220 is influenced by a spring 226 and limited in its movement in one direction by a flange overlying the link 222. This detent comprises a nose adapted to be arrested in front of the flange 218, as shown in Figure 18. However, if any numeral key is depressed, the said flange 218 will move to the left out of engagement with said detent and the link 222 will be moved rearward by the spring 226, rocking the shaft 225. Near the left hand side of the machine the shaft 225 has fixed thereon, an arm 227, having a stud 228 projecting through a slot in a locking ear 230, bent up from a plate 231 mounted for front and rear sliding movement. The construction is such that when the link 222 moves rearward as above described, the slide 231 moves rearward and the ear 230 moves under a lever 232, (which is normally held up by a spring 233) and locks that lever against downward motion. It will be perceived that the lever 232 is so locked during each computing cycle of the machine. A bail shaped lever 234 pivoted on a transverse horizontal axis at 235, has an arm 236 overlying the lever 232 and controlled by it. The lever 234 has a depending arm, 237 to which is pivoted the forward end of a link 238, which at its rear end has a slot 240, through which passes a stud 241, projecting from a lever 242, pivoted in the lower part of the machine, at 243. Said lever 242 also has pivoted thereto an upwardly and rearwardly extending link 244, which at its rear end has a slot through which passes a stud on the link 54, herein before described. The lever 242 is urged counter-clockwise in Figure 18, by spring 245. The whole construction is such that the spring 245 tends to rock the lever 242 counter-clockwise and swing the link 54 rearward to total-taking position, and when the ear 230 is under the lever 232 the parts are locked in add position. The lever 234 has a third depending arm 246 to which is pivoted the so-called total slide 247 which extends toward the rear of the machine and has in it a horizontal slot 248 by which it is guided on the stud 153, as shown in Figure 15. As shown in said Figure 15 and also in Figure 18, the link 247 has beneath the stud 153, a vertical section or portion 250 to which is attached a spring 251, drawing this total link toward the rear of the machine and aiding by its energy, the action of the spring 245, in swinging link 54 to total position. At its extreme rear end the link 247 carries a roller 252 which lies in the path of the movement of an arm of the cam disc 156, herein before referred to. The construction is such that this arm action on the roller 252 restores the total slide and all of its connecting parts to the normal position shown in Figure 18, in the last part of the return stroke of the operating shaft and holds them in normal position as long as said shaft is stationary. The cam disc 156 has on part of its periphery a concentric flange 253 adapted to cooperate with a roller 254 on the total link 247, said flange terminating normally just above said roller. When the shaft 52 makes its forward stroke, this flange 253 moves down either in front of the roller 254 or behind it, depending upon the position of the slide 247 at the time, and positively retains the slide in either position until the end of the return stroke.

It is desirable that the link 54, Fig. 18, be held in either its forward or its rearward position by stiff spring pressure so as to seat the stud 57 or 58 firmly in the slot 55 or 56. To this end, the link 244 is connected to the stud on the link 54 by a slot and by a spring 254 connecting two studs, one on the link 54 and the other on the link 244, and the lever 242, when swung forward is swung to such an extent as to put this spring under tension. The position of the stud to which the link 244 is connected needs to be determined with some accuracy and the drawings show provision for its adjustment. As shown, said stud is not secured directly to the link 54 but is secured to an arm 255 pivoted concentrically with the link 54 and secured rigidly thereto in adjusted position by a screw 256 passing through a slot in the link 54.

In order to assure that the link 54 is also held in its rear or total-taking position by spring pressure, the stud 241 plays in a slot 240 in the end of the link 238, for the reason that the position of the link 247 is rather rigidly fixed by the cooperation of the roller 254 and flange 253.

As some degree of precision is necessary at this point also, the drawing shows means for adjusting the length of the slot 240 by providing a separate slotted plate 260 which can be slid on the rear end of the link 238 for adjustment and rigidly secured in position by a screw 261. The rear end of the link 222 is prolonged upward to make a finger 262 lying in the path of a pin 263, projecting from the cam disc 136 fixed on the main shaft 52 at the right hand side of the machine. This pin restores the slide 222 and connected parts to unlocking position at the end of each forward stroke of the main shaft 52. With the parts standing as shown in Figure 18, if a numeral key is operated, the stop carriage steps to the left, freeing the detent 220 from the flange 218 and allowing the spring 226 to move the link 222 rearward, rocking the shaft 225, moving the locking ear 330 under the lever 232 and locking the total taking mechanism against operation during the succeeding cycle of the machine. During the forward stroke of the main shaft the pin 263 will restore the slide 222 but as the flange 218 is at that time in a leftward position, the slide 222 will move rearward during the return movement of the pin so that at the end of the cycle the ear 230 will be left in locking engagement with the lever 232. The carriage will be restored to its right hand position, but the detent 220 will be standing at the rear of the flange 218. If now a stroke be imparted to the main shaft without any numeral key having been depressed, the arm of 156 will move away from the roller 252 leaving the spring 251 free to actuate the total link so far as said arm is concerned, but the forward end of the total link is locked by the arm 236 overlying the locked arm 232, and the parts will therefore not be set for total-taking. At the end of the forward stroke of the shaft the pin 263 will restore the slide 22, the detent 220 snapping in front of the flange 218 where it will be held on the return stroke of the shaft, but at this time the total link is held by the flange 253 engaging the roller 254 Fig. 15. This is the blank stroke, and it leaves the parts in the position shown in Figure 18. If now a second stroke be imparted to the main shaft without depressing a key then at the beginning of the forward stroke of the shaft, the lever 232 being unlocked, the arm of 156 will permit the total slide to move rearward setting the machine automatically in total-taking position and the total will be taken and printed. At the end of the total stroke the parts again resume the position shown in Figure 18 so that, if desired, a succession of total strokes could be taken. It will be perceived that after a computing operation the first idle stroke of the operating mechanism will not take a total but will unlock the total slide so that every succeeding stroke will be a total stroke in character, even though the first such stroke may have cleared the register wheels.

During total taking cycles it is necessary that all of the slides 18 and racks 21 be free to move rearwardly in the machine. In the normal position of the machine, however, such a movement is prevented by the previously mentioned flange or stop plate 206 (Fig. 24), which lies in the path of the bent-over ears 17 of the slides 18. A means is, therefore, provided for lifting this plate out of the path of the ears 17 at the start of the total cycle. This means is not shown herein, but takes the form of a projection extending rightwardly from the link 238 (Fig. 18) and cooperative with an upstanding portion of the flange 206. Thus, when the link moves rearwardly to set the element 54 to total taking position, it acts, at the same time, to rock the flange 206 to an ineffective position. A mechanism for this purpose is shown in Fig. 1 of the Mehan Patent 2,114,604, wherein the link 81 corresponds to the present link 238.

In order to prevent the taking of a total when the subtract key 130 is locked down, which obviously might cause a misoperation, the key lever 132 is made with a flange 129 which, (Figs. 22 and 23) overlies a pin 229 on the latch lever 220, so that whenever the subtract key is down, flange 129 trips said latch 220 and prevents the slide 222 from being retained in its forward position, even though the stop carriage 13 be in its initial position.

*Fugitive one mechanism*

In order to obtain true negative balances provision is made for transferring the fugitive one from the register wheel of highest order to that of lowest order (Figs. 6–9). To this end a special slide 2110 is provided similar to the slides 21 but without rack teeth and without provision for controlling any printing hammer, said slide having on it a slide 1810 like the slides 18, but without the ear 17 and without the special locking provision at the rear end of it. This slide has a flange 86 the same as the slide 21 and is controlled in the same manner by a finger 194 of a transfer pawl but with this difference, namely, that the slot 1960 into which the flange 86 moves when the lug 191 is depressed by the transfer tooth of the wheel of highest order is longer than the slots in the ordinary slides, so as to give to the slide 2110 a substantial extent of motion when, on a change of sign in the total, this slide is released. The slide 2110 is also made with a depending finger 265 adapted to strike a pivot screw 266 to limit its rearward motion. Pivoted to the vertical section of the slide 2110 by pin and slot connection 267, is a Y-shaped link or hook 268 having the upper branch thereof shaped into a hook 270 and the lower branch into a hook 271. The two branches of this member pass between the two cheek plates of a lever 272 pivoted on the screw 266, said cheek plates being connected by two shouldered rivets 273. When the link 268 is swung up, as shown in Fig. 7, its upper hook 270 engages the upper rivet 273 and if at this time the slide 2110 be released said hook will rock the lever 272 counter-clockwise. When said link 268 is swung to its lower position, as shown in Fig. 6, if then the slide be tripped off, the lower hook 271 will swing the lever 272 clockwise unless the lever already occupies the position shown in Fig. 6. The link 268 is swung to its two said positions by means of a link 274 pivoted thereto and to an arm 275 constituting one arm of a long bail pivoted on the shaft 125 hereinbefore referred to and the bar 276 of which extends across to the right hand side of the machine where the other arm of the bail is prolonged into a lever arm 277 having downward and having at its end a stud 278. As best shown in Figs. 4 and 9 the subtract slide 112 has an arm projecting toward the front of the machine and having two ears 280 bent off therefrom toward the left and embracing the stud 278. The construction is such that when said slide moves to the add position shown in Fig. 3 it rocks the bail 275—276—277 clockwise and swings the hook member 268 to its lower position, shown in Fig. 6.

When, however, the subtract slide 112 moves to its rear or subtract position, shown in Fig. 4, it swings the hook member to its upper position, shown in Fig. 7.

The lever 272 is operatively connected by a few gear teeth with an arm 281 of a bail pivoted at 282 and extending across beneath the register mechanism to a point just to the right of the units wheel where the bail has its right hand arm 283 also pivoted. Said arm 283 extends upward and terminates goose-neck fashion in a V shaped tooth 284 whose inclined edges are adapted to act cam fashion on a stud 285, projecting from the transfer pawl 185 which controls the slide 21 of units order. The whole construction is such that when the lever 272 is rocked in either direction the bail 281—283 is rocked in the opposite direction. The arm 283 and tooth 284 have two positions, in one of which the tooth 284 is forward of the stud 285, as shown in Figs. 6 and 7, and in the other of which said tooth is at the rear of said stud; and in the act of swinging from either of these positions to the other, the tooth 284 trips the transfer pawl 185 and causes the fugitive one to be registered on the units wheel. An expansion spring 286 engaging a fixed stud at one end and a stud on the arm 283 at its other end, is so arranged as to cross its dead center when the parts swing from one of the said positions to the other so that said spring tends to retain the parts in either position.

It will be noted that the special slide 2110 has more mechanism to operate than an ordinary transfer device and for this reason said slide is given a longer forward jump on transfer than usual with provision at 267 for lost motion between it and the hook link 268. This slide when released, therefore, moves at first freely long enough to acquire some little momentum before it is required to swing the lever 272 and connected parts. This device adds greatly to the certainty of operation of the transfer.

The mode of operation of the above mechanism is as follows: Assuming that the machine contains a positive total, as long as numbers are added the mechanism will at the end of each cycle come to the position shown in Figs. 6 and 9. Whenever, however, the mechanism is set for subtraction the hook link 268 will be moved to its upper position, shown in Fig. 7. If now a number be subtracted greater than the sum already registered, the wheel of highest order will be turned from 0 to 9 and the transfer pawl 186, Fig. 9, will be depressed and the slide 2110 will jump towards the front of the machine, the hook 270 will rock the lever 272 counter-clockwise and the arm 283 clockwise causing the tooth 284 to pass over the pin 285, momentarily depressing it, and said tooth will pass on beyond said pin to the position shown in Fig. 8. This trips the transfer affecting the units rack and subtracts one from the units wheel, as shown in Fig. 8. It will be perceived that the levers 272 and 283 will occupy the positions shown in Fig. 8 as long as the total indicated on the register remains negative. Even if the capacity of the register should be exceeded so that there was another transfer from the wheel of highest order, the slide 2110 would jump forward as before but the hook 270 would find the lever 272 already in its rocked position and nothing would happen. If now on further computation the machine is set for addition then the link 268 will rock back to its lower position shown in Fig. 6, but the lower rivet 273 will then be in its rear position instead of in its forward position. If now a number be added in excess of the negative total already registered, then when the slide 2110 is tripped and jumps forward the hook 271 will rock the lever 272 and the arm 283 back to their (Fig. 6) positions, where they will remain as long as the total indicated on the register continues positive. In this return motion of the lever 283 the tooth 284 will again act on pin 285 and cause the fugitive one to be added into the units wheel.

It will be perceived that the position of the parts 272 and 281 serve as an index to the sign of the total registered on the wheels. As long as this total is positive these parts will occupy the position shown in Fig. 6 and as long as the total is negative they will occupy the position shown in Fig. 8. This fact is utilized in the printing of totals as will presently appear.

*Automatic register reversing mechanism*

The so called credit balance mechanism includes not only means for indicating a true negative balance on the register wheels, but also means for automatically setting the machine for subtraction on the blank stroke in case the balance indicated on the wheels is negative, and for automatically setting the machine for addition in case the balance is positive. Thus the operator, to take a total, has only to give two strokes to the operating mechanism and the total will automatically be printed in its true character whether positive or negative.

The means for automatically setting the machine for addition or subtraction as the case may be on taking totals, is controlled by the member 281 the position of which indicates the state of the register. It will be recalled that the machine is set for subtraction by lifting the arm 122, Fig. 9, also that said arm, which is on the right hand side of the machine, is connected through yoke bar 126 with a depending arm 127 on the left side of the machine. This depending arm has lost motion pin and slot connection 290 with a horizontal bar 291 extending therefrom towards the rear of the machine, Figs. 9 and 20. Said bar has near its rear end a horizontal slot 292 by which it is guided for longitudinal motion on a stud 293 secured to a lever 294 which lever is pivoted to the frame plate 31 on a fixed stud 295. Said lever 294 carries a follower roller 296 adapted to bear against a cam 297 fast on the main shaft 52, the lever 294 being urged counter-clockwise by a spring 298 to press said roller against said cam. In the normal position of the parts the roller rests on a low part of the cam or rather against a rather steep incline so that in the very first part of the forward stroke of the shaft the roller is forced towards the rear of the machine which motion can be effected without moving the bar 291, the stud 293 merely sliding in the slot. When the lever 294 is thus rocked it will, however, carry the bar 291 with it and set the machine for subtraction in case the register indicates a negative total. To this end there is pivoted on the stud 293 a pawl 300 adapted to engage beneath a flange 301 bent off of the rear end of the bar 291, said pawl having a shoulder adapted to engage the forward edge of said flange and to move the bar 291 rearward. The pawl is urged upward into engagement with the ear 301 by a spring 302. Said pawl has a depending arm from which a stud 304 projects across the forward end of a blocking piece of lever 305 pivoted on a transverse shaft 306. This blocking member or lever gets a wide bearing on the shaft 306 by reason of its yoke form, as shown in Fig. 9, and it has a depending arm which is connected by a link 307 with a depending arm of the member 281 hereinbefore described. It will be recalled that this part 281 stands in the position shown in Figs. 9 and 20 whenever the register contains a positive total. In this position of the parts the link 307 holds the blocking member 305 with its end squarely behind the stud 304 with the result that if the shaft 52 be rocked and the lever 294 be rocked clockwise the stud 304 will be arrested by the part 305 and as the pivot 293 moves rearward the pawl 300 will be deflected downward so that its tooth will pass under the flange 301 without operating it. If, however, the part 281 is in its alternative position indicating a negative total the link 307 will have been moved towards the front of the machine and the member 305 will have been rocked upward and the stud 304 will not be blocked and the pawl 300 will draw the link 291 towards the rear of the machine. This link will rock the arm 127, bail bar 126 and subtract lever 122 and cause the machine to be set for subtraction on the blank stroke of the machine.

If means were not provided to prevent it the mechanism just above described would obviously set the machine automatically for subtraction at every operation thereof when the register indicates a negative total. In order to prevent the pawl 300, Fig. 9, from having that effect except on blank strokes, another blocking device 308 is provided for the stud 304 and so connected that it always blocks said stud except when the stop carriage 13 is in its initial right hand position. This member 308 is also in the nature of a lever of bail design pivoted on the shaft 306 and having a depending arm which is connected by a long horizontal link 310 with a lever arm 311 at the front of the machine. Said arm 311 is pivoted on a stud 312 projecting from the left hand outside frame plate 33, and said arm is one branch of a bail which also comprises a long transverse bail bar 313 extending across the front of the machine and ending in an arm 314 pivoted on another stud 312 projecting from the right hand frame plate 34. Near its right hand end the frame of the stop carriage 13 has a sheet metal finger 315, Fig. 20, projecting forward therefrom and an ear or finger 316 is bent forward from the bail bar 313 in such position that when the stop carriage is in its initial right hand position the finger 315 acting on the ear 316 prevents clockwise rotation of the forward bail including the arm 311. This holds the link 310 in its rear position and holds the blocking lever 308 depressed out of the path of the stud 304, as shown in Figs. 9 and 20. As soon, however, as the stop carriage makes a step the finger 315 moves leftward out of engagement with the ear 316 and the parts are rocked clockwise by a spring 317 swinging the arm 308 into blocking engagement with the stud and thus rendering the pawl 300 ineffective to set the machine for subtraction. The ear 316 is rounded at 319 (Fig. 9) so that, on the rightward movement of the carriage, the ear 315 can cam it forward. In the present machine the finger 315 is actually the extreme right-hand tooth of the escapement rack 4. If, however, it should be desired to alter the throw of the bail bar 313, it would be a simple matter to fix an adjustable part to either the carriage 13 or the rack 4.

By the mechanism just described the machine will automatically be set for subtraction only on blank strokes; and it will be so set on every blank stroke when the mechanism finds a negative total on the register wheels. In case the last computing operation was a subtraction and the register indicates a positive total, the mechanism will automatically be set on the blank stroke to addition in the same manner as hereinbefore described.

*Numeral printing mechanism*

The numeral printing mechanism has not been substantially changed from prior disclosures of this machine. The types, at the proper moment, are driven against the paper by hammers 320 pivoted at 321, Fig. 1, and actuated by springs 322. The hammers are restored by a bail bar 323, Figs. 1 and 3, joining two arms 324, one at each side of the machine and each pivoted at its lower end at 325. The right hand one of these arms, shown in Figs. 3 and 4, carries a follower roller 326 cooperating with an internal cam cutout in the main actuating cam 203 on the shaft 52. The forward edge of this cutout is concentric with the shaft but the rear edge is inclined outward and in the normal position of the shaft said rear edge has forced the roller 326 and the bail frame 323—324 to their forward position against the tension of a suitable spring, thus forcing the type hammers to their forward positions. Fig. 4 shows the parts in the position they occupy at the end of the forward stroke where the cam edge 327 has widened out so as to permit the roller 326 and the bail frame to result their rear positions leaving the hammers free of the bail. When the hammers are thus restored they are locked by a bail 328 mounted on a shaft 330 and released automatically at the proper instant in the usual manner. The hammers are also equipped with the usual individual latches 331, Fig. 1, each having a forwardly extending arm 332 controlled in the usual manner by the slides 21, these latches being normally held up by bail bar 333 and influenced by springs 334.

*Designation printing mechanism*

An extra type carrier is provided at the right of the type carrier in units place for printing designating characters including characters to indicate subtraction, totals, etc. This type carrier is controlled by an extra slide 2111, Figs. 3 and 4, the upright part of which has a lug 335 adapted to be controlled by a pivoted stepped stop member 336 projecting from a rock shaft 337. It will be recalled that the subtract key mechanism includes a lever 140 having an arm extending towards the front of the machine, which arm is rocked downward when the subtract key is depressed. This arm has pivoted thereto a link 338 the lower end of which is made with an open ended slot which embraces a pivot stud 340 on an extension of the hub of the stop arm 336. The construction is such that when the subtract key is depressed this link swings said stop arm to the extent indicated in Fig. 4 bringing the last step on said arm into the path of the lug 335 and permitting to the member 2111 its maximum extent of motion. The subtract type is, therefore, the bottom one of the four types on this type carrier.

The arm 140 is not rocked when the machine is set for subtraction automatically on the blank stroke and on total strokes and this subtract sign is, therefore, not printed at that time. On the contrary, a star to indicate a total is printed at that time.

In order to indicate automatically in the printing when a printed total is negative, the following mechanism is provided (Figs. 3, 4 and 9): On a stud 341 projecting rightward from the frame plate 32 there is mounted a printing lever 342 urged rearward by a spring 343. The upper end of this lever is made into a V-shaped device 344 adapted to strike the paper or the ribbon and to make a horizontal minus mark. The upper end of the lever 342 is given a double bend to offset it towards the left so as to bring this mark just to the right of the characters printed by the character types above referred to. The offset bend in this lever furnishes a horizontal portion thereof which is utilized as a means for controlling the lever 342. To this end a latch lever 345 is pivoted on the stud 106, said lever having a forwardly extending arm 347 which lies beneath a collar on the right hand trunnion 43 of the register frame, and this latch is urged into engagement by a spring 348. The construction is such that the latch always engages the type lever 342 when the register is out of engagement with the racks and is moved out of engagement with the type lever when the register is moved into engagement with the racks. In computing cycles the register is not moved into the racks until after the printing operation takes place and, therefore, at that time the special type bar 342 is locked. In total taking operations the register is in engagement at the time of printing and this special minus type bar is, therefore, free of the latch 345 at that time and in case the total is negative the minus sign will be printed but it will not be printed in case the total is positive.

In order to prevent the printing lever 342 from printing when the total is positive, said lever is made with a forwardly extending arm 350 having an ear 351 bent off rightward therefrom as most plainly shown in Fig. 4. The subtract slide 112 has a cooperating ear 352 bent off leftward therefrom in such a position that when, as in Fig. 3, the lever 342 is in its retracted position and the slide 112 is in adding position the interlocking engagement of these two ears will lock the lever 342 against operation. When the total is negative, however, slide 112 is always moved to its rear position shown in Fig. 4 and the ear 352 is thus moved out of the path of the ear 351 and the minus sign is printed.

An additional lock 353 for lever 342 may be provided to cause it to be held in inactive position until the proper moment. This lock consists of a latch lever pivoted on the stud 106 and urged into engagement by a spring 354. The lower edge of this latch is made with an incline 355 by which the latch is lifted by the bail 323 when the latter swings to its rear position just before printing takes place.

The lever 342 is suitably guided by a headed screw 360 passing through an arcuate slot in said lever. In order to restore the lever to its retracted position it is made with a cam shaped lower arm 361 and finger 362 on the right hand arm 324 acts on this arm 361 to restore the lever 342 at the same time that the type hammers are restored.

The mechanism disclosed herein, for printing a special character to designate a negative balance, forms the subject matter of applicant's copending application S. N. 238,596, filed November 3, 1938, and is claimed therein.

*Register restoring mechanism*

At the end of each total-taking operation, the automatic total slide 247, Fig. 18, is restored to normal position by the arm of cam 156 swinging the link 54 back to its forward position. This would leave the register out of mesh, and, if the main shaft 52 were then given another operation, the wipe pawl 66 would not throw it back in until the return stroke, which would be too late. For this reason a bell-crank, 400, shown by dot-dash lines in Fig. 5, is pivoted on the stud 76, and its forwardly extending arm overlies a stud 401 on the cradle arm 44. The other arm of said bell crank lies in the path of a stud 402 on the piece 85 which is fast on the main shaft 52. The construction is such that at the last part of the return stroke of said shaft, said stud 402 rocks said bell-crank 400 clockwise, and said bell-crank, acting on the stud 401, depresses the register into engagement, ready for another total stroke. Such a second total stroke would be needed in certain instances of taking sub-totals.

This bell-crank 400 is also utilized to restore the transfer pawls and latches. At the end of the forward stroke of the main shaft, a second stud 403 on the piece 85 rocks said bell-crank counter-clockwise and its horizontal arm acts on an ear 404 bent off from an arm 405 mounted on a rock shaft 406 and rocks the latter clockwise in Fig. 5, which is counter-clockwise in Fig. 1. As shown in Fig. 1, the shaft 406 has a plate or bar 407 mounted thereon and underlying the tails of the transfer latches 190. The rocking of this plate at the end of the forward stroke restores any of said latches that may have been set, allowing the tripped pawls to return to normal position.

Various changes may be made in the details of construction and arrangement without departing from my invention.

Having thus described my invention, what I claim as new and desire to secure by Letters Patent is:

1. In a computing machine, the combination of a set of actuators, a register assembly comprising in each denomination two intermeshed register wheels, means for reversing said assembly to engage alternatively with said actuators one of said wheels for positive amounts and the other for negative amounts, transfer mechanism including a transfer tooth on each wheel and a transfer trip member in each denomination operable by the transfer tooth of that wheel which is in mesh with the actuator, and means for controlling certain elements of the machine for total-taking, including a stop set to arrest the transfer tooth of that wheel of each pair which is out of mesh with the actutaor at the time.

2. In a computing machine the combination of a set of actuators, a register assembly comprising in each denomination two intermeshed register wheels, means for reversing said assembly to engage alternatively with said actuators one of said wheels for positive amounts and the other for negative amounts, transfer mechanism including means for inserting the fugitive one to accumulate true positive and negative totals and including also a transfer tooth on each wheel and a transfer trip member in each denomination operable by the transfer tooth of that wheel which is in mesh with the actuator, means for controlling certain elements of the machine for total-taking including a stop set to arrest the transfer teeth of the negative set of wheels in taking a positive total and of the positive set of wheels in taking a negative total, said means arresting the register wheels at positive zero in the former instance and at negative zero in the latter instance.

3. In an adding and subtracting machine, the combination of a register cradle frame having two sets of intermeshed register wheels therein, actuators for said wheels, means for moving said cradle frame toward and from said actuators to engage and disengage said wheels, a pinion on said cradle frame, a rack engaging said pinion when said wheels are out of mesh, means for moving said rack to reverse said frame for addition and subtraction, and a lock to retain said rack in its extreme positions when out of mesh with said pinion, said lock comprising a lug on the rack member and a co-operating part on said cradle which part is moved into the path of said lug when said cradle is moved toward said actuators.

4. In an adding and subtracting machine, the combination of register actuators, a register having two sets of intermeshed register wheels settable alternatively into engagement with said actuators for addition and subtraction, a pair of pawl plates or bars, one engageable with the wheels of one set and positively preventing rotation thereof in one direction and the other engageable with the wheels of the other set and positively preventing rotation thereof in the same direction, whereby the two pawl bars together positively prevent rotation of the wheels in both directions, and means for moving said pawl bars simultaneously out of engagement with said wheels and for controlling the movement of said pawl bars into engagement with said wheels, said last mentioned means acting directly on one of said plates in addition and directly on the other of said plates in subtraction.

5. In an adding and subtracting machine, the combination of register actuators, a register having two sets of intermeshed register wheels settable alternatively into engagement with said actuators for addition and subtraction, means for moving said register toward and away from said actuator to engage and disengage said wheels and said actuators, a pair of detent plates or bars one engageable with the wheels of one set and the other with the wheels of the other set, a connection between said plates whereby they are moved into and out of engagement with said wheels in unison, and means for controlling the movement of said plates into engagement with said wheels in conjunction with the movement of said wheels away from said actuators, and for moving said plates out of engagement with said wheels in conjunction with the movement of said wheels toward said actuators, said last mentioned means acting directly on one of said plates in addition and directly on the other of said plates in subtraction.

6. In a ten-key adding, subtracting and listing machine, the combination of a traveling carriage controlled by the keys, registering mechanism, printing mechanism, operating mechanism, means controlled in part by said carriage for causing a total to be taken from said registering mechanism automatically by repeated operation of said operating mechanism, a subtract key, and means whereby said subtract key controls the connection of said automatic total mechanism with said carriage to prevent the automatic taking of a total when the subtract key is operated.

7. In an adding and subtracting machine, the combination of a register cradle frame in which is supported two sets of intermeshed register wheels; actuators for said wheels; means for moving said cradle frame toward and from said actuators to engage and disengage said wheels and said actuators; a pinion on said cradle frame; a rack engaging said pinion when said wheels are out of engagement with said actuators; means for moving said rack to reverse said frame for addition and subtraction, said means including a pair of positively driven actuating elements having separate paths of movement within the same plane, and a slide operatively connected to said rack and formed with two contact points each of which is adapted to be engaged by an associated one of said actuating elements; and means for shifting said slide relatively to said actuating elements to render one of said actuating elements effective and the other ineffective.

8. In an adding and subtracting machine, the combination of a register cradle frame in which is supported two sets of intermeshed register wheels, actuators for said wheels, means for moving said cradle frame toward and from said actuators to engage and disengage said wheels and said actuators, means for reversing said cradle frame for addition and subtraction, means for operating said reversing means including a pair of positively driven actuating elements and a slide operable by both of said actuating elements, and means for shifting said slide relatively to said actuating elements to render one of said elements effective and the other ineffective.

9. In an adding and subtracting machine, the combination of register actuators, a register having two sets of intermeshed wheels, means for moving said register toward and from said actuators to engage and disengage said wheels and said actuators, means for reversing said register to place one of said sets of wheels in co-operative relation with said actuators for addition and the other of said sets of wheels in cooperative relation with said actuators for subtraction, two detent plates, one for each set of wheels, means connecting said plates whereby they are moved in unison into and out of engagement with said wheels, said means being spring-pressed to retain said plates normally in engagement with said wheels, and means for moving said plates out of engagement with said wheels in conjunction with the movement of said register toward said actuators, said last mentioned means acting directly on one of said plates in addition and directly on the other of said plates in subtraction.

10. In an adding and subtracting machine, the combination of register actuators, a register having two sets of intermeshed wheels, means for moving said register toward and from said actuators to engage and disengage said wheels and said actuators, means for reversing said register to place one of said sets of wheels in cooperative relation with said actuators for addition and the other of said sets of wheels in co-operative relation with said actuators for subtraction, two detent plates, one for each set of wheels, means connecting said plates whereby they are moved in unison into and out of engagement with said wheels, said means being spring-pressed to retain said plates normally in engagement with said wheels, and means controlled by said means for moving said register toward and from said actuators for moving said plates out of engagement with said wheels in conjunction with the movement of said register toward said actuators, said last mentioned means acting directly on one of said plates in addition and directly on the other of said plates in subtraction.

11. In an adding and subtracting machine, the combination of register actuators, a register having two sets of intermeshed register wheels settable selectively into engagement with said actuators for addition and subtraction, a pair of detent plates one engageable with the wheels of one set and the other with the wheels of the other set and both spring pressed into engagement with their respective set, and means for moving said plates out of engagement with said wheels, said last mentioned means acting directly on one of said plates in addition and directly on the other of said plates in subtraction.

12. In an adding and subtracting machine, the combination with a set of register actuators, a register assembly comprising two sets of intermeshed register wheels and a lug mounted on each of said register wheels, and means for reversing said register assembly to position selectively one set of said wheels in cooperative relation with said actuators for addition and the other of said sets in cooperative relation with said actuators for subtraction, of means for moving said register assembly toward and from said actuators to engage and disengage said wheels and said actuators, said means including positively driven actuating elements and a link intermediate said actuating elements and said register assembly shiftable relatively to said actuating elements to vary the time of operation of said register assembly by said actuating elements, and means for controlling certain elements of the machine for total taking including mechanism for shifting said shiftable link and a stop bar operatively connected to said shiftable link and movable thereby into the paths of the lugs on the set of register wheels which is out of cooperative relation with said actuators to arrest said intermeshed wheels at zero.

WALTER W. LANDSIEDEL.

CERTIFICATE OF CORRECTION.

Patent No. 2,203,336. June 4, 1940.

WALTER W. LANDSIEDEL.

It is hereby certified that error appears in the printed specification of the above numbered patent requiring correction as follows: Page 2, second column, line 1, for the word "rock" read --rack--; page 9, first column, line 41, for "slide 22" read --slide 222--; and second column, line 66, for "having" read --hanging--; page 11, second column, line 37, for "result" read --resume--; page 12, second column, line 61, claim 1, for "actutaor" read --actuator--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.